US010827470B2

(12) United States Patent
Tang et al.

(10) Patent No.: US 10,827,470 B2
(45) Date of Patent: Nov. 3, 2020

(54) CONTROL CHANNEL TRANSMISSION METHOD, NETWORK DEVICE AND TERMINAL DEVICE

(71) Applicant: GUANGDONG OPPO MOBILE TELECOMMUNICATIONS CORP., LTD. OPPO, Dongguan, Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/340,687

(22) PCT Filed: Dec. 23, 2016

(86) PCT No.: PCT/CN2016/111839
§ 371 (c)(1),
(2) Date: Apr. 10, 2019

(87) PCT Pub. No.: WO2018/112935
PCT Pub. Date: Jun. 28, 2018

(65) Prior Publication Data
US 2019/0297615 A1      Sep. 26, 2019

(51) Int. Cl.
*H04W 72/00* (2009.01)
*H04W 72/04* (2009.01)
(Continued)

(52) U.S. Cl.
CPC ....... *H04W 72/0406* (2013.01); *H04L 5/0048* (2013.01); *H04W 16/28* (2013.01); *H04W 72/046* (2013.01)

(58) Field of Classification Search
CPC ............ H04L 5/0048; H04W 72/0406; H04W 16/28; H04W 72/046
See application file for complete search history.

(56) References Cited

U.S. PATENT DOCUMENTS

| 2010/0054196 A1* | 3/2010 | Hui | H04W 16/00 370/329 |
| 2011/0269451 A1* | 11/2011 | Liu | H04W 48/12 455/422.1 |

(Continued)

FOREIGN PATENT DOCUMENTS

| CN | 102246425 | 11/2011 |
| CN | 103297981 | 9/2013 |

(Continued)

OTHER PUBLICATIONS

English, machine translation of CN108023629A, retreived from the internet on Apr. 21, 2020 (Year: 2020).*

(Continued)

*Primary Examiner* — Benajmin H Elliott, IV
(74) *Attorney, Agent, or Firm* — Hodgson Russ LLP

(57) ABSTRACT

Disclosed are a control channel transmission method, a network device and a terminal device. The method comprises: a first network device receiving first information, which is sent by a second network device, comprising information for indicating a first time-frequency resource; the first network device determining a second time-frequency resource in a control region of a second beam, the second time-frequency resource comprising at least part of the first time-frequency resource; the first network device receiving second information sent by the second network device, the second information comprising a control channel; and the first network device sending, on the second time-frequency resource, the control channel to a terminal device via the second beam, wherein a first beam is a service (Continued)

beam of a first terminal device, and the second beam is a non-service beam potentially interfering with the service beam of the first terminal device.

10 Claims, 12 Drawing Sheets

(51) Int. Cl.
*H04L 5/00* (2006.01)
*H04W 16/28* (2009.01)

(56) References Cited

U.S. PATENT DOCUMENTS

| | | | | |
|---|---|---|---|---|
| 2012/0156984 | A1* | 6/2012 | Gan | H04L 5/0094 |
| | | | | 455/7 |
| 2013/0170449 | A1* | 7/2013 | Chen | H04L 25/03866 |
| | | | | 370/329 |
| 2014/0036858 | A1* | 2/2014 | Shimezawa | H04L 5/0094 |
| | | | | 370/329 |
| 2015/0063201 | A1* | 3/2015 | Kim | H04B 7/18513 |
| | | | | 370/316 |
| 2015/0092695 | A1* | 4/2015 | Zhao | H04W 24/00 |
| | | | | 370/329 |
| 2015/0103784 | A1* | 4/2015 | Lorca Hernando | H04L 5/0032 |
| | | | | 370/329 |
| 2016/0192336 | A1* | 6/2016 | Choi | H04W 72/042 |
| | | | | 370/329 |
| 2016/0255612 | A1* | 9/2016 | Sartori | H04W 72/042 |
| | | | | 370/329 |
| 2016/0366687 | A1* | 12/2016 | Guo | H04L 5/0053 |
| 2017/0048832 | A1* | 2/2017 | Nogami | H04L 5/001 |
| 2018/0132243 | A1* | 5/2018 | Yang | H04W 72/0453 |
| 2018/0152962 | A1* | 5/2018 | Lee | H04L 5/1469 |
| 2018/0254809 | A1* | 9/2018 | Huang | H04B 7/0695 |
| 2018/0279278 | A1* | 9/2018 | Pan | H04L 5/0007 |
| 2019/0081688 | A1* | 3/2019 | Deenoo | H04L 5/0055 |
| 2019/0132851 | A1* | 5/2019 | Davydov | H04B 7/08 |
| 2019/0182004 | A1* | 6/2019 | Doll | H04L 27/2613 |
| 2019/0253949 | A1* | 8/2019 | Park | H04W 36/305 |
| 2019/0261380 | A1* | 8/2019 | Iyer | H04B 7/0695 |
| 2019/0268056 | A1* | 8/2019 | Wang | H04B 7/0617 |
| 2019/0297615 | A1* | 9/2019 | Tang | H04W 16/28 |

FOREIGN PATENT DOCUMENTS

| | | |
|---|---|---|
| CN | 104081854 | 10/2014 |
| CN | 105556869 | 5/2016 |
| EP | 1387598 | 2/2004 |
| EP | 2712230 | 3/2014 |
| EP | 2879320 | 6/2015 |
| WO | 2013183823 | 12/2013 |

OTHER PUBLICATIONS

WIPO, ISR for PCT/CN2016/111839, dated Oct. 11, 2017.
EPO, EESR for EP Application No. 16924224, dated Jul. 12, 2019.
TIPO, Office Action for TW Application No. 106144059, dated Sep. 2, 2019.

* cited by examiner

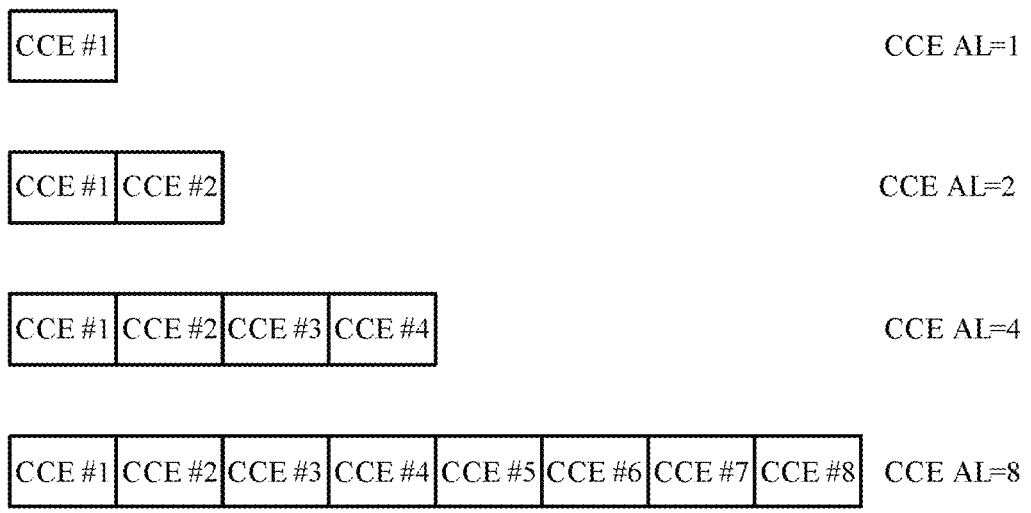
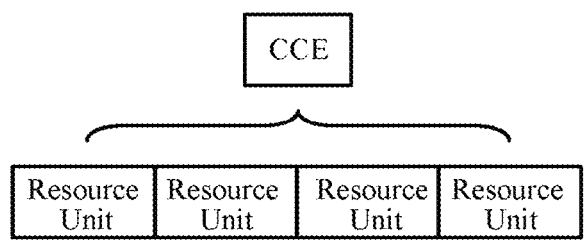
Fig.3
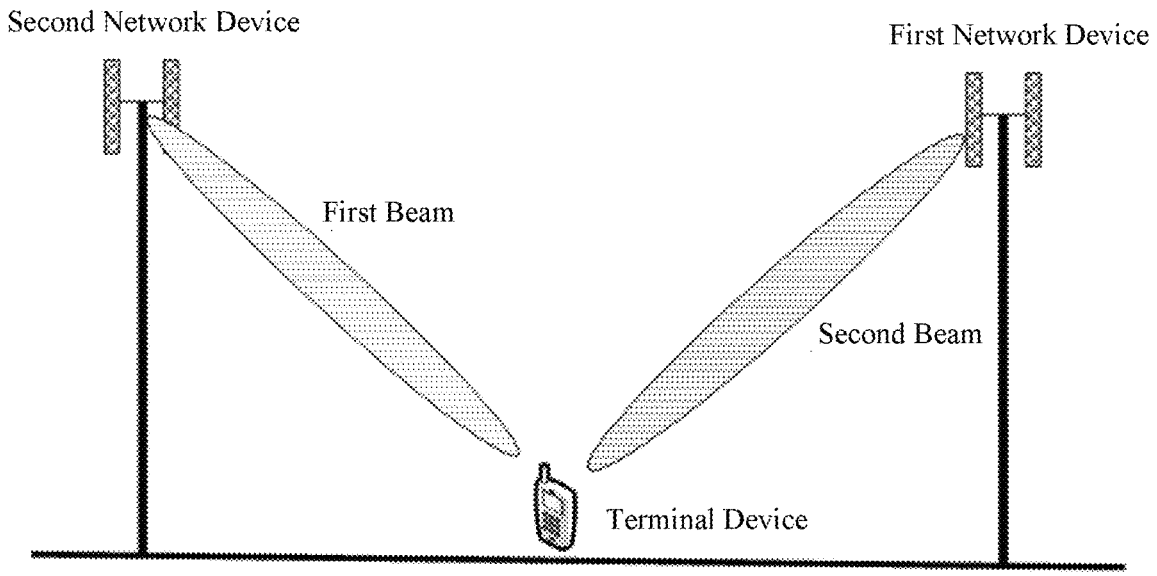
Fig.4

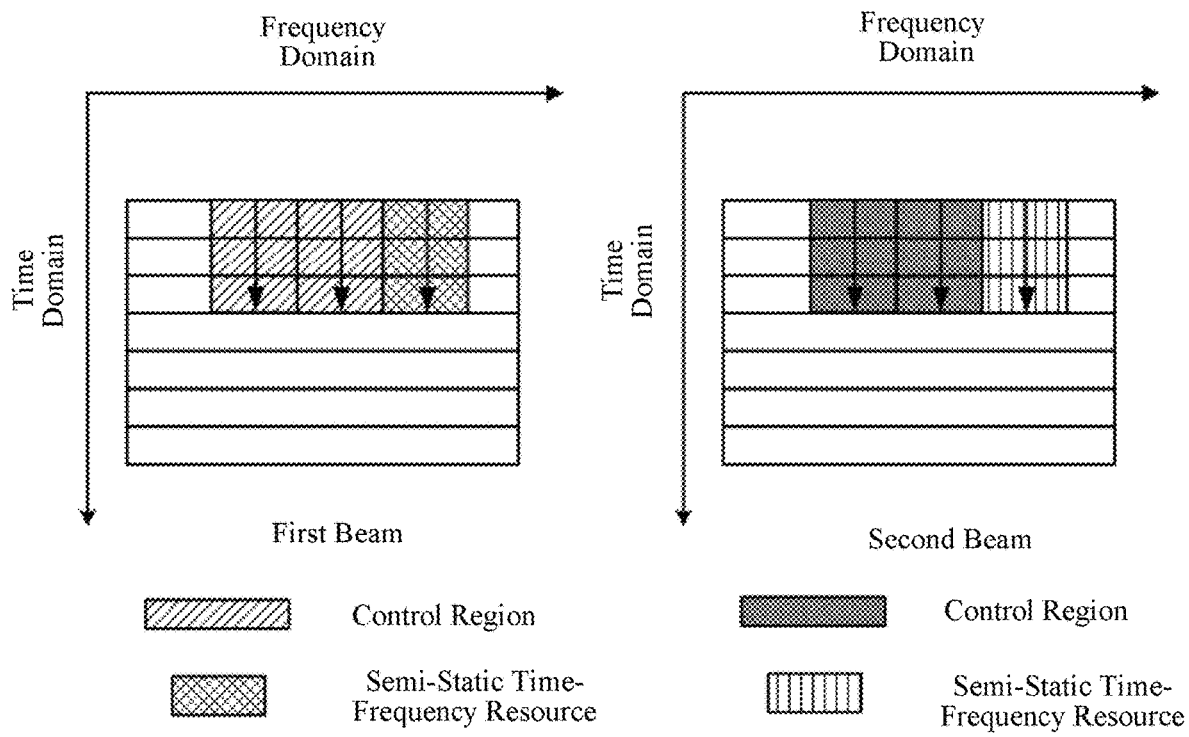

A terminal device acquiring configuration information of a first time-frequency resource, wherein the first time-frequency resource is a source in a control region of a service beam. — S610

The terminal device receiving control channel according to the configuration information, wherein the control channel is transmitted from a network device on the first time-frequency resource via a first beam and on a second time-frequency resource via a second beam, and the first time-frequency resource is the resource in the control region of the first beam, the second time-frequency resource is the resource in the control region of the second beam, the second time-frequency resource comprising at least part of the first time-frequency resource, wherein the first beam is a service beam of the terminal device, and the second beam is a non-service beam potentially interfering with the service beam of the terminal device. — S620

Fig.19

CONTROL CHANNEL TRANSMISSION METHOD, NETWORK DEVICE AND TERMINAL DEVICE

CROSS-REFERENCE TO RELATED APPLICATION

This application is a National Stage Entry of International Application No. PCT/CN2016/111839, filed on Dec. 23, 2016, the entire disclosure of which is incorporated herein by reference.

TECHNICAL FIELD

This application relates to the field of communication, and particularly to a control channel transmission method, a network device and a terminal device.

BACKGROUND

In a Long Term Evolution (LTE) system, a control channel, for example, a Physical Downlink Control Channel (PDCCH), is usually transmitted in first few symbols of each sub-frame. A control channel of a terminal device is transmitted by being allocated on a certain time-frequency resource of entire control region, which is determined via the identification (ID) of the terminal device and other parameters. Such a method of determining time-frequency resources may reduce interference between control channels of neighboring cells to a certain extent.

With the continuous development of wireless communication technologies, wireless communication system has gradually increased the requirements for coverage and bandwidth of wireless bands used for transmission. The wireless communication system may guarantee the coverage capability of the network through beamforming technology. The beamforming technology is an antenna array-based signal preprocessing technology that produces a directional beam by adjusting the weighting coefficients of each array element in the antenna array to obtain a significant array gain.

In the beamforming technology, after the terminal device accesses cell, the network device to which the cell belongs allocates a beam suitable for the terminal and used for transmitting data or transmitting a control channel. Since coverage areas overlap, interference may occur between different beams of the same network device, and interference may further occur between beams of different network devices. In general, the control channel has stricter requirements on reception performance, which seriously affects the performance of the terminal receiving the control channel.

SUMMARY

The present application provides a control channel transmission method, a network device and a terminal device, which may avoid interference of a non-service beam and may enhance reception performance of a control channel.

According to a first aspect, a control channel transmission method is provided, comprising: receiving, by a first network device, first information, which is transmitted from a second network device, the first information comprising information for indicating a first time-frequency resource, wherein the first time-frequency resource is determined by the second network device from a control region of a first beam, and is used for transmitting a resource of the control channel to a first terminal device; determining, by the first network device, a second time-frequency resource in a control region of a second beam, the second time-frequency resource comprising at least part of the first time-frequency resource; receiving, by the first network device, second information transmitted from the second network device, the second information comprising a control channel; the first network device transmitting, on the second time-frequency resource, the control channel to the first terminal device via the second beam, wherein the first beam is a service beam of the first terminal device, and the second beam is a non-service beam potentially interfering with the service beam of the first terminal device.

In the control channel transmission method of the first aspect, the service beam and a non-service beam potentially interfering with the service beam belong to different network device. By using corresponding time-frequency resource of the non-serving beam to assist the service beam to transmit the control channel, not only the interference of the non-serving beam may be avoided, but further the joint transmission may be realized, and the reception performance of the control channel may be enhanced.

In a possible implementation of the first aspect, search space configurations of the control region of the first beam and the control region of the second beam are both configured in order of first frequency domain and then time domain, and the first time-frequency resource is at least one control resource unit on first symbol in the control region of the first beam; the second time-frequency resource is at least one control resource unit on the first symbol in the control region of the second beam.

In a possible implementation of the first aspect, search space configurations of the control region of the first beam and the control region of the second beam are both configured in order of first time domain and then frequency domain, and the first time-frequency resource is at least one physical resource block (PRB) in the control region of the first beam; the second time-frequency resource is at least one PRB in the control region of the second beam.

In a possible implementation of the first aspect, the second information further comprises configuration information used by the second network device to send demodulation reference signal; the first network device sends, on the second time-frequency resource, the control channel to the first terminal device, comprising: the first network device transmitting according to the configuration information sends, on the second time-frequency resource, the demodulation reference signal of the control channel to the first terminal device via the second beam.

In a possible implementation of the first aspect, the method further comprises: determining, by the first network device, a third time-frequency resource from the control region of the second beam; the first network device transmitting third information to a third network device, the third network device comprising information for indicating a third time-frequency resource, so that the third network device assists the second beam to transmit the control channel to a second terminal device on a fourth time-frequency resource in the control region of a third beam, the fourth time-frequency resource comprising at least part of the third time-frequency resource; transmitting, by the first network device, on the third time-frequency resource, the control channel to the second terminal device via the third beam.

According to a second aspect, a control channel transmission method is provided, comprising: receiving, by a first network device, first information, which is transmitted from a second network device, the first information comprising information for indicating a first time-frequency resource, wherein the first time-frequency resource is determined by the second network device from a control region of a first beam, and is used for transmitting a resource of the control channel to a first terminal device; determining, by the first network device, a second time-frequency resource in a control region of a second beam, the second time-frequency resource comprising at least part of the first time-frequency resource; reducing, by the first network device, on the second time-frequency resource, power for transmitting the control channel to other terminal devices via the second beam, wherein the first beam is a service beam of the first terminal device, and the second beam is a non-service beam potentially interfering with the service beam of the first terminal device.

In the control channel transmission method of the second aspect, the service beam and a non-service beam potentially interfering with the service beam belong to different network device. Reducing the power of corresponding time-frequency resource of the non-service beam for transmitting the control channel to other terminal devices, not only the interference of the non-serving beam may be avoided, but also the joint transmission may be realized, and the reception performance of the control channel may be enhanced.

In a possible implementation of the second aspect, the first network device reducing, on the second time-frequency resource, power for transmitting the control channel to other terminal devices via the second beam, comprises: reducing, by the first network device, on the second time-frequency resource, the power for transmitting the control channel to other terminal devices to zero.

In a possible implementation of the second aspect, search space configurations of the control region of the first beam and the control region of the second beam are both configured in order of first frequency domain and then time domain, and the first time-frequency resource is at least one control resource unit on first symbol in the control region of the first beam; the second time-frequency resource is at least one control resource unit on the first symbol in the control region of the second beam.

In a possible implementation of the second aspect, search space configurations of the control region of the first beam and the control region of the second beam are both configured in order of first time domain and then frequency domain, and the first time-frequency resource is at least one physical resource block (PRB) in the control region of the first beam; the second time-frequency resource is at least one PRB in the control region of the second beam.

In a possible implementation of the second aspect, a search space configuration of the control region of the first beam is configured in order of first time domain and then frequency domain, a search space configuration the control region of the second beam is configured in order of first frequency domain and then time domain, the first time-frequency resource is at least one physical resource block (PRB) in the control region of the first beam; the second time-frequency resource is at least one PRB in the control region of the second beam.

In a possible implementation of the second aspect, the search space configuration of the control region of the first beam is configured in order of first frequency domain and then time domain, the search space configuration the control region of the second beam is configured in order of first time domain and then frequency domain, the first time-frequency resource is at least one control resource unit in the control region of the first beam; the second time-frequency resource is at least one physical resource block (PRB) comprising at least one control resource unit.

According to a third aspect, a control channel transmission method is provided, comprising: determining, by a first network device, a time-frequency resource from a control region of a first beam; transmitting, by the first network device, on the first time-frequency resource, control channel to a terminal device via the first beam; determining, by the first network device, a second time-frequency resource in a control region of a second beam, the second time-frequency resource comprising at least part of the first time-frequency resource; transmitting, by the first network device, on the second time-frequency resource, the control channel to the terminal device via the second beam, wherein the first beam is a service beam of the terminal device, and the second beam is a non-service beam potentially interfering with the service beam of the terminal device.

In the control channel transmission method of the third aspect, the service beam and a non-service beam potentially interfering with the service beam belong to same network device. By using corresponding time-frequency resource of the non-serving beam to assist the service beam to transmit the control channel, not only the interference of the non-serving beam may be avoided, but further the joint transmission may be realized, and the reception performance of the control channel may be enhanced.

In a possible implementation of the third aspect, search space configurations of a control region of the first beam and a control region of the second beam are both configured in order of first frequency domain and then time domain, and the first time-frequency resource is at least one control resource unit on first symbol in the control region of the first beam; the second time-frequency resource is at least one control resource unit on the first symbol in the control region of the second beam.

In a possible implementation of the third aspect, search space configurations of the control region of the first beam and the control region of the second beam are both configured in order of first time domain and then frequency domain, and the first time-frequency resource is at least one physical resource block (PRB) in the control region of the first beam; the second time-frequency resource is at least one PRB in the control region of the second beam.

The fourth aspect provides a control channel transmission method, comprising: determining, by a first network device, a time-frequency resource from a control region of a first beam; transmitting, by the first network device, on the first time-frequency resource, control channel to a terminal device via the first beam; determining, by the first network device, a second time-frequency resource in a control region of a second beam, the second time-frequency resource comprising at least part of the first time-frequency resource; reducing, by the first network device, on the second time-frequency resource, power for transmitting the control channel to other terminal devices via the second beam, wherein the first beam is a service beam of the terminal device, and the second beam is a non-service beam potentially interfering with the service beam of the terminal device.

In the control channel transmission method of the fourth aspect, the service beam and a non-service beam potentially interfering with the service beam belong to different network device. Reducing the power of corresponding time-frequency resource of the non-service beam for transmitting the control channel to other terminal devices, not only the interference of the non-serving beam may be avoided, but also the joint transmission may be realized, and the reception performance of the control channel may be enhanced.

In a possible implementation of the fourth aspect, the first network device reducing, on the second time-frequency resource, power for transmitting the control channel to other terminal devices via the second beam, comprises: reducing, by the first network device, on the second time-frequency resource, the power for transmitting the control channel to other terminal devices to zero.

In a possible implementation of the fourth aspect, search space configurations of the control region of the first beam and the control region of the second beam are both configured in order of first frequency domain and then time domain, and the first time-frequency resource is at least one control resource unit on first symbol in the control region of the first beam; the second time-frequency resource is at least one control resource unit on the first symbol in the control region of the second beam.

In a possible implementation of the fourth aspect, search space configurations of the control region of the first beam and the control region of the second beam are both configured in order of first time domain and then frequency domain, and the first time-frequency resource is at least one physical resource block (PRB) in the control region of the first beam; the second time-frequency resource is at least one PRB in the control region of the second beam.

In a possible implementation of the fourth aspect, a search space of the control region of the first beam is configured in order of first time domain and then frequency domain, a search space configuration of the control region of the second beam is configured in order of first frequency domain and then time domain, the first time-frequency resource is at least one physical resource block (PRB) in the control region of the first beam; the second time-frequency resource is at least one PRB in the control region of the second beam.

In a possible implementation of the fourth aspect, the search space configuration of the control region of the first beam is configured in order of first frequency domain and then time domain, the search space configuration the control region of the second beam is configured in order of first time domain and then frequency domain, the first time-frequency resource is at least one control resource unit in the control region of the first beam; the second time-frequency resource is at least one physical resource block (PRB) comprising at least one control resource unit.

The fifth aspect provides a control channel transmission method, comprising: acquiring, by a terminal device, configuration information of a first time-frequency resource, wherein the first time-frequency resource is a source in a control region of a service beam; receiving, by the terminal device, control channel according to the configuration information, wherein the control channel is transmitted from a network device on the first time-frequency resource via a first beam and on a second time-frequency resource via a second beam, and the first time-frequency resource is the resource in the control region of the first beam, the second time-frequency resource is the resource in the control region of the second beam, the second time-frequency resource comprising at least part of the first time-frequency resource, wherein the first beam is a service beam of the terminal device, and the second beam is a non-service beam potentially interfering with the service beam of the terminal device.

In the control channel transmission method of the fifth aspect, by using corresponding time-frequency resource of the non-serving beam to assist the service beam to transmit the control channel, not only the interference of the non-serving beam may be avoided, but further the joint transmission may be realized, and the reception performance of the control channel may be enhanced.

In a possible implementation of the fifth aspect, the first beam and the second beam are different beams of same network device.

In a possible implementation of the fifth aspect, the control channel is transmitted from the same network device, based on configuration of same demodulation reference signal, on the first time-frequency resource via the first beam and on the second time-frequency resource via the second beam, respectively.

In a possible implementation of the fifth aspect, the first beam and the second beam are beams of different network devices.

In a possible implementation of the fifth aspect, the control channel is transmitted from the different network devices, based on configuration of the same demodulation reference signal, on the first time-frequency resource via the first beam and on the second time-frequency resource via the second beam, respectively.

According to a sixth aspect, a network device is provided, comprising modules of the method of any of possible implementations of the first aspect or the second aspect.

According to a seventh aspect, a network device is provided, comprising modules of the method of any of possible implementations of the third aspect or the fourth aspect.

According to an eighth aspect, a network device is provided, the network comprising a processor, a memory and a transceiver to perform the method of any of possible implementations of the first aspect or the second aspect.

According to a ninth aspect, a network device is provided, the network comprising a processor, a memory and a transceiver to perform the method of any of possible implementations of the third aspect or the fourth aspect.

According to a ninth aspect, a computer readable medium is provided for storing a computer program, the computer program comprising instructions for performing the method of any of possible implementations of the first aspect or the second aspect.

According to an eleventh aspect, a computer readable medium is provided for storing a computer program, the computer program comprising instructions for performing the method of any of possible implementations of the third aspect or the fourth aspect.

According to a twelfth aspect, a terminal device is provided, the terminal device comprising modules for performing the fifth aspect or the method of any of possible implementations of the fifth aspect.

According to a thirteenth aspect, a terminal device is provided, the terminal device comprising a processor, a memory and a transceiver to perform the fifth aspect or the method of any of possible implementations of the fifth aspect.

According to a fourteenth aspect, a computer readable medium is provided for storing a computer program, the computer program comprising instructions for performing the fifth aspect or the method of any of possible implementations of the fifth aspect.

BRIEF DESCRIPTION OF THE DRAWINGS

FIG. 3 is a diagram illustrating control channel elements of embodiments of the present disclosure;

FIG. 4 is a diagram illustrating beams of multiple network devices cover one terminal device;

FIG. 18 is a diagram illustrating the control channel transmission method of another embodiment of the present disclosure;

FIG. 19 is a flow chart diagram illustrating the control channel transmission method of another embodiment of the present disclosure;

DETAILED DESCRIPTION

The technical solutions in the embodiments of the present disclosure will be described below with reference to accompanying drawings.

Figure 1:
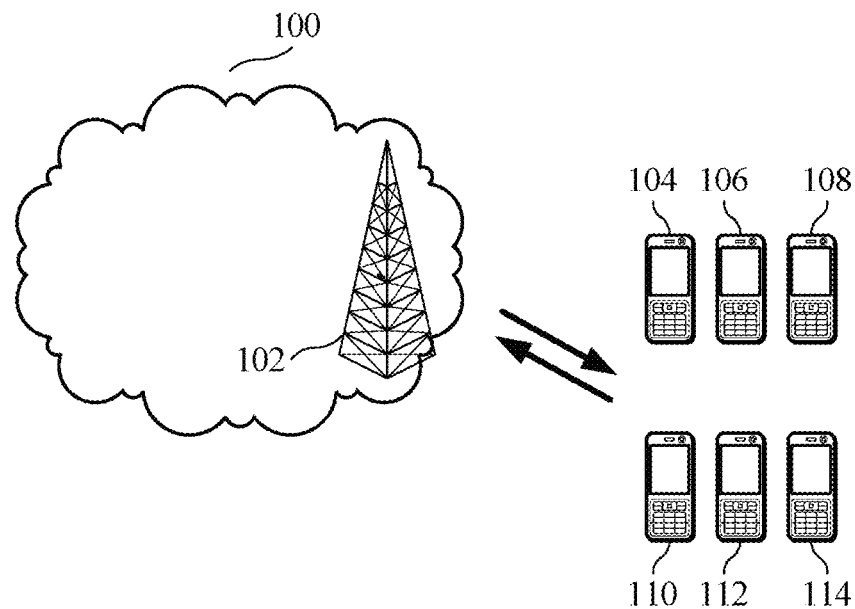
FIG. 1 is a diagram illustrating a communication system that may be applied to embodiments of the present disclosure.

FIG. 1 is a diagram illustrating a communication system that may be applied to embodiments of the present disclosure. As shown in FIG. 1, a network 100 may comprises a network device 102 and terminal devices 104, 106, 108, 110, 112 and 114, and the connection between the network device and the terminal devices is wireless. It should be understood that FIG. 1 only takes the network comprising one network device as an example, but the embodiments of the present application is not limited thereto. For example, the network may further comprise more network devices; similarly, the network may further comprise more terminal devices, and the network device may further comprise other devices.

The present application describes various embodiments in combination with a terminal device. The terminal device may further refer to user equipment (UE), an access terminal, a subscriber unit, a subscriber station, a mobile station, a mobile table, a remote station, a remote terminal, a mobile device, a user terminal, a terminal, a wireless communication device, and a user agent or user device. An access terminal may be a cellular phone, a cordless phone, a Session Initiation Protocol (SIP) phone, a Wireless Local Loop (WLL) station, or a Personal Digital Assistant (PDA), handheld devices with wireless communication capabilities, computing devices or other processing devices connected to wireless modems, vehicle on-board devices, wearable devices, terminal devices in future 5G networks, or terminal devices in future evolutional public land mobile networks (PLMN), etc.

The present application describes various embodiments in combination with a terminal device. The network device may be a device for communicating with the terminal device, and the network device may be a base station (Base Transceiver Station, BTS) in GSM or CDMA, or a base station (NodeB, NB) in the WCDMA system, or may be a evolved base station (Evolutional Node B, eNB or eNodeB) in the LTEsystem, and may further be a wireless controller in a Cloud Radio Access Network (CRAN) scenario, or the network device may be a relay station or an access point, vehicle on-board devices, wearable devices, and network devices in future 5G networks or future evolutional network devices in future evolved PLMN networks.

There are at least two types of downlink control channels for the 5G system, one is a common control channel, and the other is a UE-specific downlink control channel. The common control channel is used to broadcast some common information to all terminal devices or a part of terminal devices. The terminal device configures the downlink control channel, which is used to send downlink related control information to designated terminal device, such as a configuration signal related to data transmission. The terminal device determines, in a downlink time domain scheduling unit, such as a slot or mini-slot, whether the network has downlink data transmission by detecting the downlink control information configured by the terminal device, and uses relevant configuration signal to demodulate the downlink data. The technical solutions of the embodiments of the present application may be applied to the terminal device to configure a downlink control channel.

Figure 2:
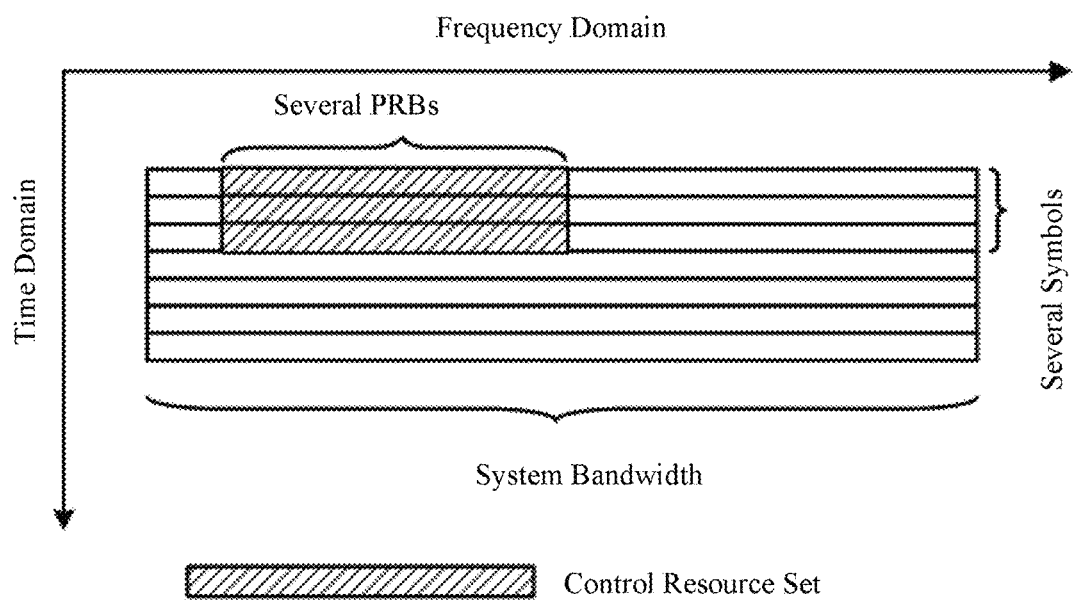
FIG. 2 is a diagram illustrating a resource set of embodiments of the present disclosure.

5G system is difference from 4G system in that, in the 5G system, a downlink control region, further called a control resource set, does not cover entire system bandwidth in the frequency domain, but only a part of frequency domain resource. This region may consist of a number of physical resource block (PRB) that are contiguous or non-contiguous in the frequency domain. This is because coverage frequency band of the 5G system may be very wide (especially in high frequency band), so that the terminal device needs to consume a large amount of terminal device resource to detect the control channel over entire frequency band. In the time domain, the downlink control region is not composed of all Orthogonal Frequency Division Multiplexing (OFDM) symbols in a time domain scheduling unit, but is composed of one or several OFDM symbols. In general, these OFDM symbols are located at the beginning of the downlink time domain scheduling unit. Consideration of design in this way is to allow the terminal device to have sufficient time to demodulate a data channel after detecting the control signal, so that needs of some applications, especially needs of low-latency applications are met. FIG. 2 shows such a resource set.

Generally, transmission of control channel has to undergo the following steps: the control signal is appended with a cyclic error correction code at the end, and then encoded, modulated, preprocessed (for example, using transmitting diversity or beamforming), and then transmitted on distributed physical resources.

Due to different load amount of the control channel, a coded code rate is further different (according to channel quality and bit error rate requirements). One downlink control channel may be transmitted using one or several Control Channel Elements (CCEs), such as using 1, 2, 4, 8, . . . control channel elements, which are further referred to as control channel element aggregation levels (CCE Aggregation Level, CCE AL). As shown in FIG. 3, one control channel element may in turn be composed of several control resource units. One control resource unit is a time-frequency resource composed of one PRB on the frequency domain and one (or several) OFDM symbols on the time domain, which can be regarded as the minimum resource unit used for the control channel transmission.

A downlink control region can be shared by multiple terminal devices, meaning that their downlink control channels will be transmitted in this downlink control region. In order to prevent the downlink control channels of different terminal devices from colliding in the same downlink control region, downlink control channel sent to each of terminal devices needs to be transmitted on a specific resource, and the terminal device further needs to search for the downlink control channel of its own blind detection on a specific resource. These specific resources and different control channel candidates which are possible to be transmitted above, such as candidates based on the same or different CCE ALs, are collectively referred to as search space of the downlink control channel of the terminal device.

When resources of the control channel transmission are allocated to different terminal devices in the downlink control region, the resources may be mapped with a method of first time domain and then frequency domain according to the search space configurations. For example, the method of first time domain and then frequency domain comprises: first mapping an OFDM symbol on a first physical resource block PRB in the control region along a time domain, and then mapping an OFDM symbol on a next PRB in the control region.

When the resources of the transmission control channel are allocated to different terminal devices in the downlink control region, the resources may be mapped with a method of first frequency domain and then time domain according to the search space configuration. For example, the method of first frequency domain and then time domain comprises: first mapping a first orthogonal frequency division multiplexing OFDM symbol in the control region along the frequency domain, and then mapping the next OFDM symbol in the control region.

In the 5G system, design of the control channel has further changed due to the introduction of the beamforming technology. Each of cells (or each of network devices, or each of transmission nodes) can support multiple beams, and each of beams can use its own control region to send control signals required by the terminal devices covered by the beams. Since the beamforming technique is used, in order to enhance the coverage of the control channel, a demodulation reference signal (for example, Demodulation Reference Signal, DMRS) may be used as the demodulation reference signal of the control channel.

Figure 5:
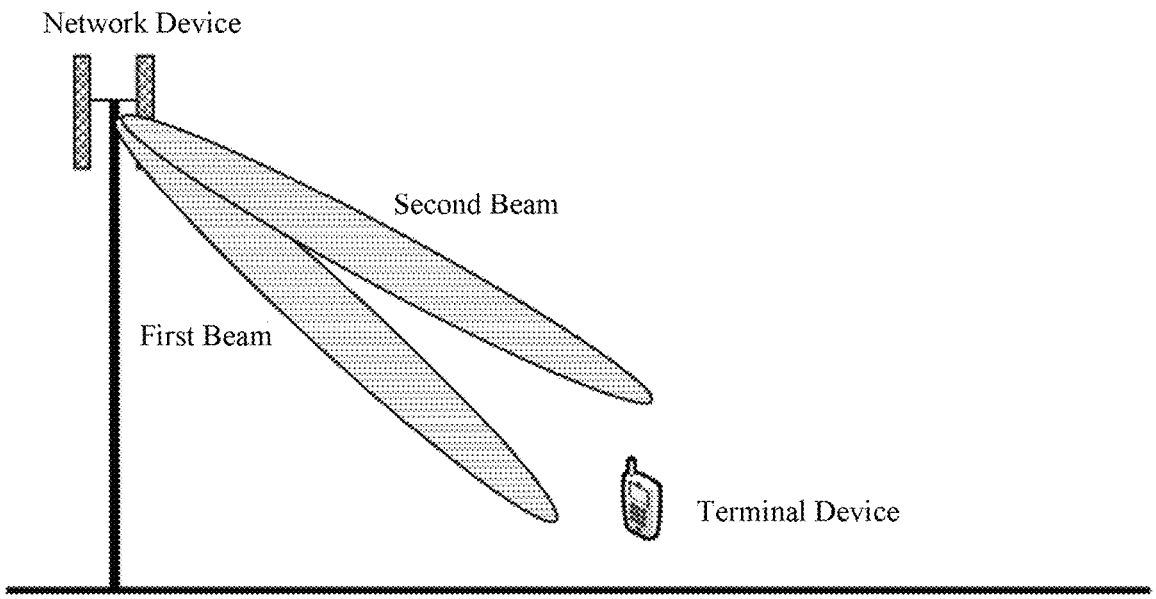
FIG. 5 is a diagram illustrating multiple beams of the same network device cover one terminal device.

FIG. 4 and FIG. 5 are respectively show diagrams of two scenarios in which multiple beams are applied. FIG. 4 is a diagram illustrating beams of multiple network devices cover one terminal device. As shown in FIG. 4, the first beam of the second network device may cover the terminal device, and the second beam of the first network device may further cover the terminal device. FIG. 5 is a diagram illustrating multiple beams of the same network device cover one terminal device. As shown in FIG. 5, both the first beam and the second beam of the network device may cover the terminal device. If the first beam is the service beam of the terminal device, the second beam is the non-service beam of the terminal device. Then the second beam may interfere with the first beam, that is, the second beam is a non-service beam potentially interfering with the service beam of the terminal device.

In summary, the use of multiple beams may result in coverage overlapping regions between multiple beams, which may interfere with the receiving control channels of the terminal devices in these overlapping regions. Therefore, the transmission of the control channels of the beams needs to be coordinated.

Figure 6:
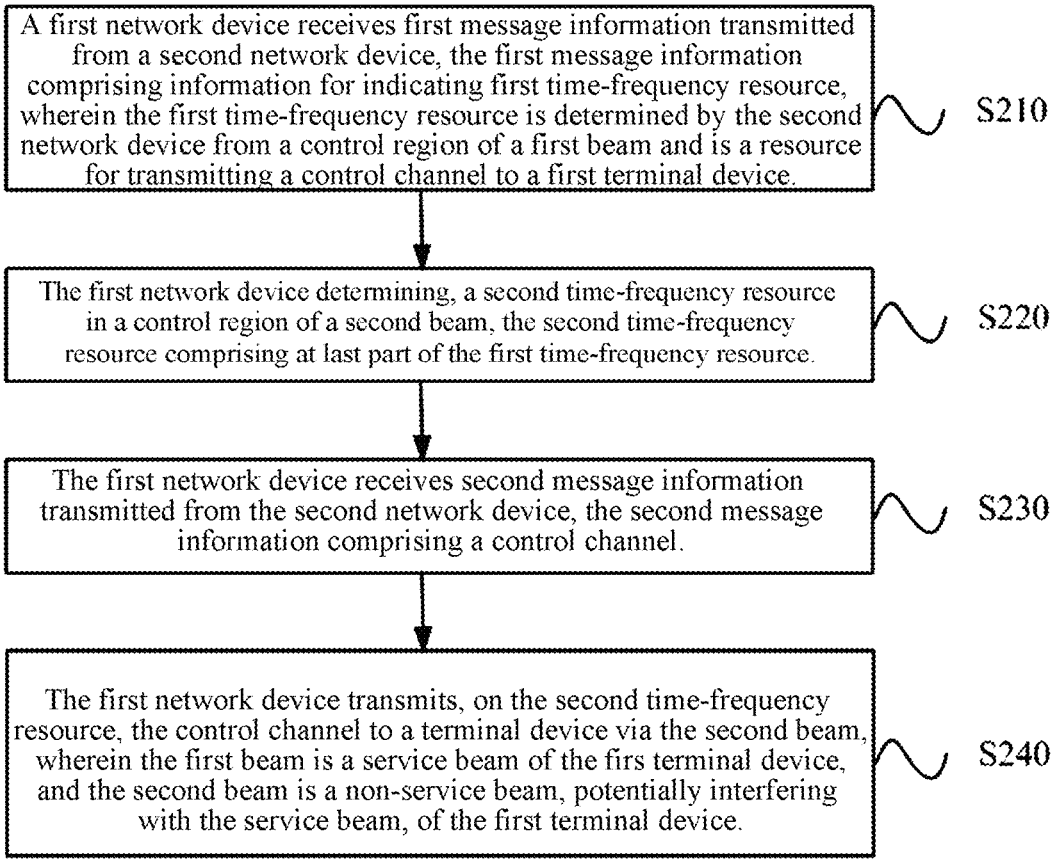
FIG. 6 is a flow chart diagram illustrating the control channel transmission method of one embodiment of the present disclosure.

FIG. 6 is a flow chart diagram illustrating the control channel transmission method 200 of one embodiment of the present disclosure. The method 200 is applicable to the scenario shown in FIG. 4 and is performed by the first network device. The method 200 may comprise the following steps.

In S210, a first network device receives first message information transmitted from a second network device, the first message information comprising information for indicating first time-frequency resource. The first time-frequency resource is determined by the second network device from a control region of a first beam and is a resource for transmitting a control channel to a first terminal device.

In S220, the first network device determines a second time-frequency resource in a control region of a second beam, the second time-frequency resource comprising at last part of the first time-frequency resource.

In S230, the first network device receives second message information transmitted from the second network device, the second message information comprising a control channel.

In S240, the first network device transmits, on the second time-frequency resource, the control channel to a terminal device via the second beam. The first beam is a service beam of the first terminal device, and the second beam is a non-service beam, potentially interfering with the service beam of the first terminal device.

In the control channel transmission method of the embodiments of the present disclosure, the service beam and the non-serving beam of a potential interference service beam belong to different network devices. By using the corresponding time-frequency resources of the non-serving beam to assist the service beam transmission control channel, not only the interference of the non-serving beam can be avoided, but further a joint transmission can be realized, and the receiving performance of the control channel can be enhanced.

Wherein, in order to implement the non-serving beam of the second network device assisted the service beam to transmit the control channel, the first time-frequency resource of the second network device of control channel transmission needs to be notified to the first network device, so that the first network device reserves the corresponding time-frequency resources; the content of the control channel is further required to be notified to the first network device, so that the first network device assists the transmission. The first information and the second information may be transmitted at the same time, or may be separately sent, which is not limited by the embodiments of the present disclosure.

It should be understood that the second network device may monitor the signal strength or other parameters of the terminal device it serves, and when it finds that the terminal device is located at an edge of the cells, it determines the non-serving beam potentially interfering with the service beam, and communicates with the first network device to which the non-serving beam belongs.

Figure 7:
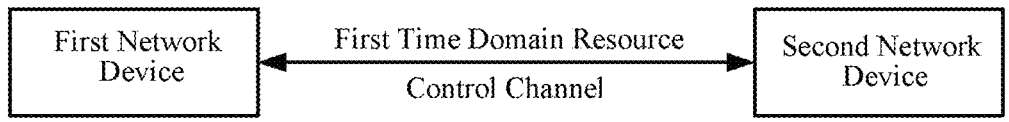
FIG. 7 is a diagram illustrating communication between the first network device and the second network device of one embodiment of the present disclosure.

FIG. 7 is a diagram illustrating communication between the first network device and the second network device of one embodiment of the present disclosure. As shown if FIG. 7, the first network device communicates directly with the second network device, for example, communication is performed by wireless communication or by wired communication such as an optical fiber. The second network device transmits related information and a control channel of the first time-frequency resource to the first network device. The information of the first time-frequency resource may be information of the time-frequency resource itself, or may be a Radio Network Tempory Identity (RNTI) of the terminal device capable of obtaining the time-frequency resource. A transmission mode of the control channel and the search space configuration may further be communicated between the first network device and the second network device to help the first network device determine corresponding measures for avoiding interference.

Figure 8:
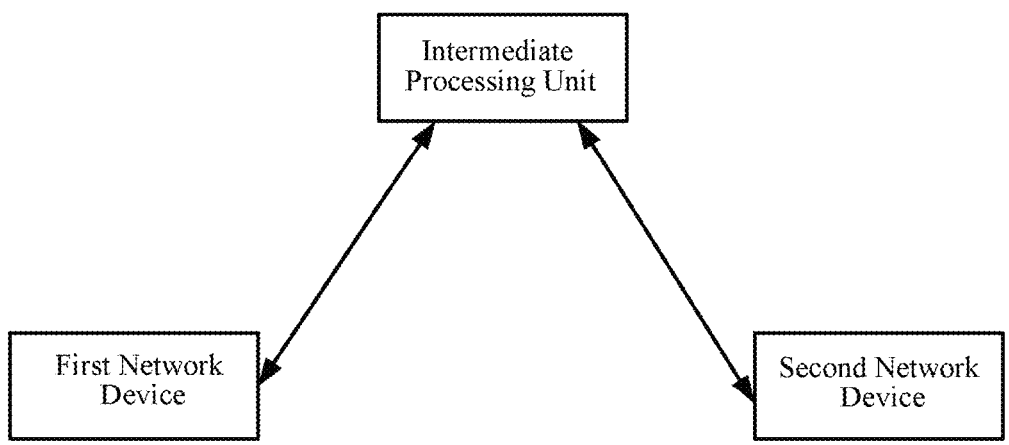
FIG. 8 is a diagram illustrating communication between the first network device and the second network device of another embodiment of the present disclosure.

FIG. 8 is a diagram illustrating communication between the first network device and the second network device of another embodiment of the present disclosure. As shown in FIG. 8, the first network device and the second network device can communicate indirectly, for example, communication may be performed by an intermediate processing unit, which is not limited by the embodiments of the present disclosure.

Optionally, as an embodiment, the second information may further comprise: configuration information used by the second network device to transmit the demodulation reference signal. In S240, the first network device transmitting, on the second time-frequency resource, the control channel to the first terminal device via the second beam, may further comprises: the first network device according to the configuration information transmitting, on the second time-frequency resource, the demodulation reference signal of the control channel to the first terminal device via the second beam.

Different network devices or different cells in the existing solution use different demodulation reference signals. In the embodiments of the present disclosure, different network devices jointly transmit control channels. If different network devices use different demodulation reference signals, the terminal device cannot smoothly demodulate the control channel. Therefore, the second information may further comprise configuration information used by the second network device to transmit a demodulation reference signal. When the second beam of the first network device assists the first beam of the second network device to transmit the control channel to the first terminal device, the same demodulation reference signal is used according to the configuration information, so that the terminal device demodulates the control channel.

Figure 9:
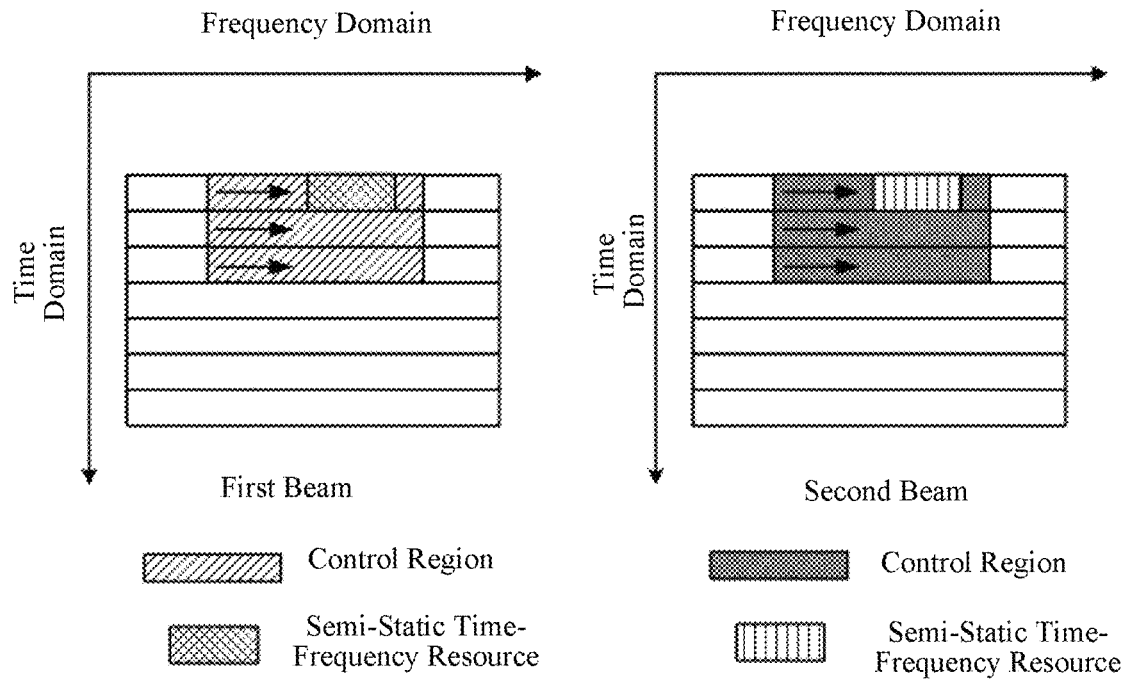
FIG. 9 is a diagram illustrating the control channel transmission method of one embodiment of the present disclosure.

The non-service beam of the second network device assists the service beam of the first network device to transmit the control channel, which may be the following cases: search space configurations of the control region of the first beam and the control region of the second beam are both configured in order of first frequency domain and then time domain, and the first time-frequency resource is at least one control resource unit on first symbol in the control region of the first beam; the second time-frequency resource is at least one control resource unit on the first symbol in the control region of the second beam. FIG. 9 shows a specific example.

In an example shown in FIG. 9, the service beam of the terminal device, that is, the control region of the first beam (belonging to the second terminal device) is a time-frequency resource block spanning three symbols, and a search space of the control channel is in units of symbols, that is, is mapped according to the order of first frequency domain and then time domain. The control region of the second beam (belonging to the first terminal device) is further a time-frequency resource block spanning 3 symbols, and the search space of the control channel is further mapped in units of symbols, that is, by the re-frequency domain and re-time domain. Thus, as shown in FIG. 9, if the first time-frequency resource is a certain or some control resource units on the first symbol in the control region of the first beam, if the second beam is required to coordinate transmission on the control channel, and the control region of the second beam and the control region of the second beam are the same or overlap, the time-frequency resource corresponding to the first time-frequency resource, that is, the second time-frequency resource, is reserved in the control region of the second beam. If the second beam is fully coordinated, the second time-frequency resource may be identical to the first time-frequency resource, or the second time-frequency resource may completely comprise the first time-frequency resource. If the second beam is not fully coordinated, the second time-frequency resource may comprise at least a part of the resources of the first time-frequency resource. In the example shown in FIG. 9, the second time-frequency resource is identical to the first time-frequency resource. The allocation of the above resources is done by the network device, which may be transparent to the beams or other terminal devices of the network device.

The non-service beam of the second network device assists the service beam to transmit the control channel of the first network device, and may further be the following cases: search space configurations of the control region of the first beam and the control region of the second beam are both configured in order of first time domain and then frequency domain, and the first time-frequency resource is at least one physical resource block (PRB) in the control region of the first beam; the second time-frequency resource is at least one PRB in the control region of the second beam. Specific examples are shown in FIG. 10 and FIG. 11, respectively.

Figure 10:
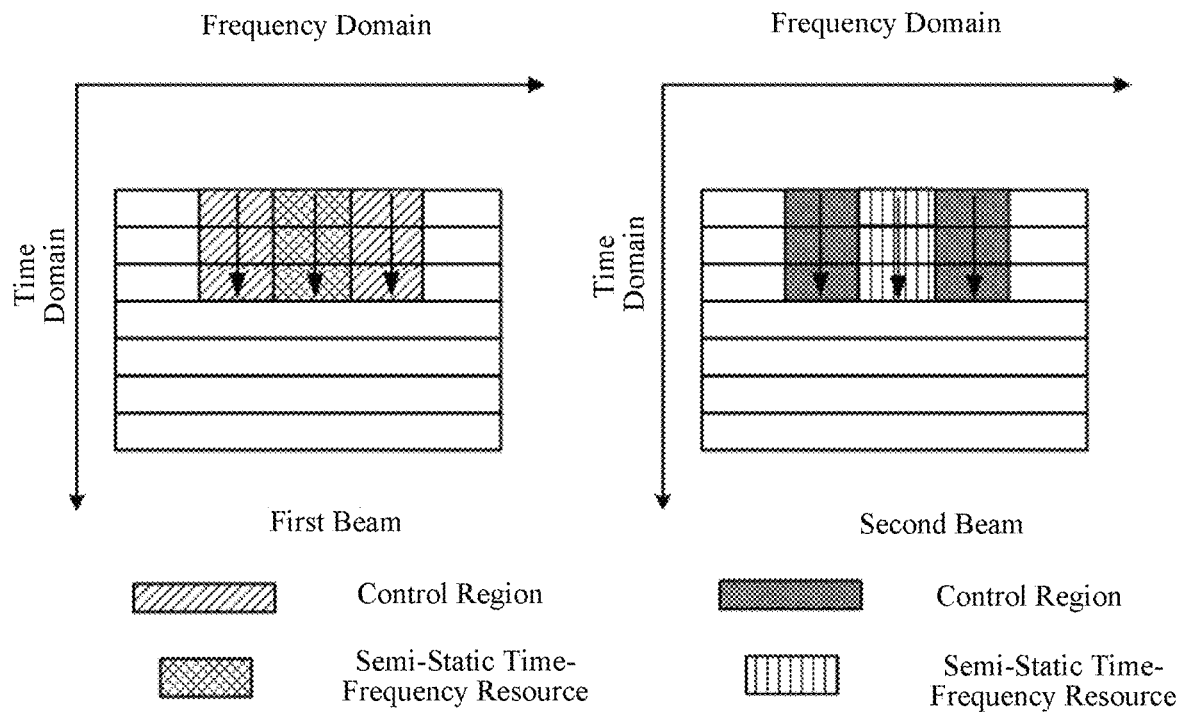
FIG. 10 is a diagram illustrating the control channel transmission method of another embodiment of the present disclosure.

In an example shown in FIG. 10, the service beam of the terminal device, that is, the control region of the first beam (belonging to the second terminal device) is a time-frequency resource block spanning three symbols, and a search space of the control channel is mapped according to the order of first time domain and then frequency domain. The control region of the second beam (belonging to the first terminal device) is further a time-frequency resource block spanning 3 symbols, and the search space of the control channel is further mapped by the re-time domain and re-frequency domain. Thus, as shown in FIG. 10, if the first time-frequency resource is a certain or some PRBs on the first symbol in the control region of the first beam, if the second beam is required to coordinate transmission on the control channel, and the control region of the second beam and the control region of the second beam are the same or overlap, the time-frequency resource corresponding to the first time-frequency resource, that is, the second time-frequency resource, is reserved in the control region of the second beam. If the second beam is fully coordinated, the second time-frequency resource may be identical to the first time-frequency resource, or the second time-frequency resource may completely comprise the first time-frequency resource. If the second beam is not fully coordinated, the second time-frequency resource may comprise at least a part of the resources of the first time-frequency resource. In the example shown in FIG. 10, the second time-frequency resource is identical to the first time-frequency resource. The allocation of the above resources is done by the network device, which may be transparent to the beams or other terminal devices of the network device.

Figure 11:
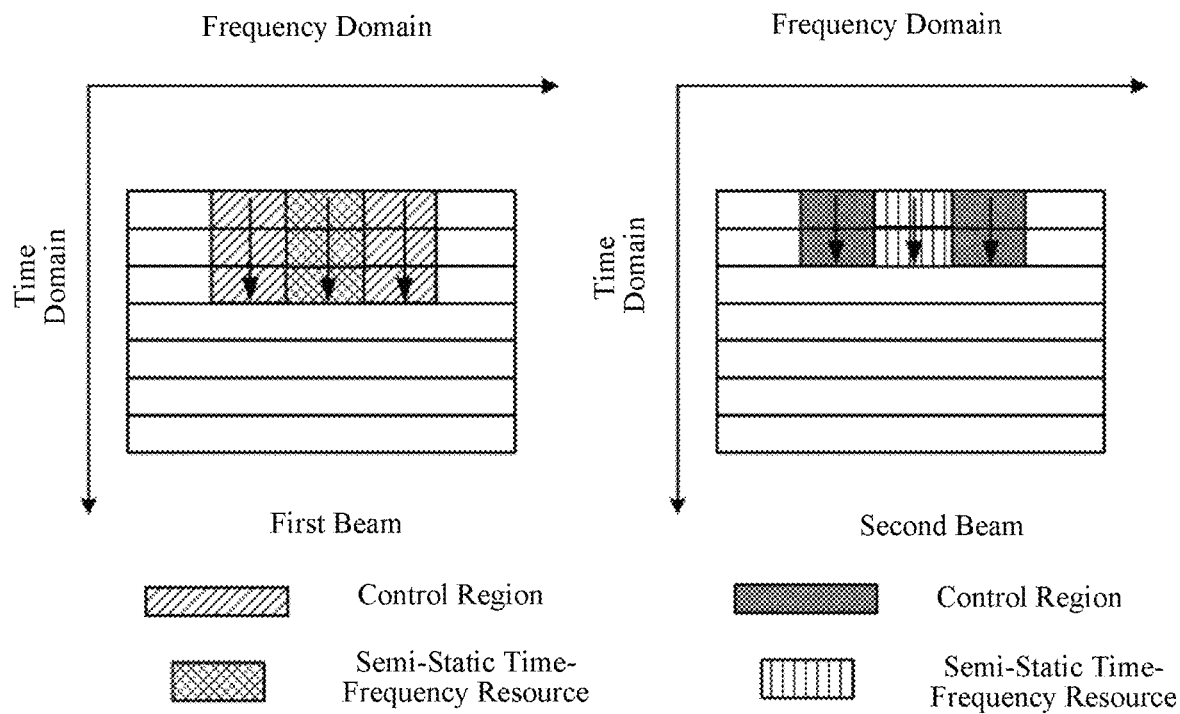
FIG. 11 is a diagram illustrating the control channel transmission method of another embodiment of the present disclosure.

In an example shown in FIG. 11, the service beam of the terminal device, that is, the control region of the first beam (belonging to the second terminal device) is a time-frequency resource block spanning three symbols, and a search space of the control channel is mapped according to the order of first time domain and then frequency domain. The control region of the second beam (belonging to the first terminal device) is a time-frequency resource block spanning two symbols, and the search space of the control channel is further mapped by the re-time domain and re-frequency domain. Thus, as shown in FIG. 11, if the first time-frequency resource is a certain or some PRBs on the first symbol in the control region of the first beam, if the second beam is required to coordinate transmission on the control channel, and the control region of the second beam and the control region of the second beam are the same or overlap, the time-frequency resource corresponding to the first time-frequency resource, that is, the second time-frequency resource, is reserved in the control region of the second beam. In the example shown in FIG. 11, the second beam cannot be fully coordinated, so the second time-frequency resource comprises part resources of the first time-frequency resource. The allocation of the above resources is done by the network device, which may be transparent to the beams or other terminal devices of the network device.

It should be understood that, generally, when the search space configurations of the control region of the second network device is the same as the search space configurations of the control region of the first network device, the non-service beam of the second network device can assist the service beam of the first network device to transmit the control channel.

Optionally, as an embodiment, the first network device may further serve as a network device serving a certain terminal device (for example, the second terminal device), where the second beam of the first network device is a serving beam. Method 200 may further comprise the following steps. The first network device determines a third time-frequency resource from the control region of the second beam. The first network device transmits third information to a third network device, the third network device comprising information for indicating a third time-frequency resource, so that the third network device assists the second beam to transmit the control channel to a second terminal device on a fourth time-frequency resource in the control region of a third beam, the fourth time-frequency resource comprising at least part of the third time-frequency resource. The first network device transmits, on the third time-frequency resource, the control channel to the second terminal device via the third beam. The second network device is a network device that serves a certain terminal device, and the first beam of the second network device is similar to the service beam, and details are not described herein again.

Figure 12:
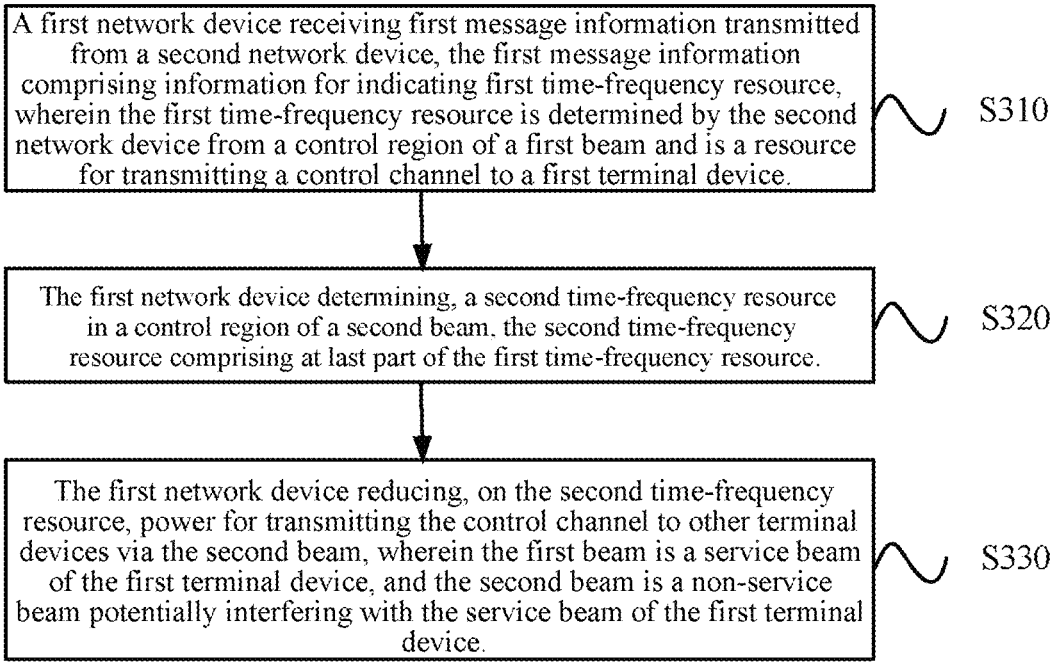
FIG. 12 is a flow chart diagram illustrating the control channel transmission method of another embodiment of the present disclosure.

FIG. 12 is a flow chart diagram illustrating the control channel transmission method 300 of another embodiment of the present disclosure. The method 300 is applicable to the scenario shown in FIG. 4 and is performed by the first network device. The method 300 may comprise the following steps.

In S310, a first network device receives first message information transmitted from a second network device. The first message information comprises information for indicating first time-frequency resource. The first time-frequency resource is determined by the second network device from a control region of a first beam and is a resource for transmitting a control channel to a first terminal device.

In S320, the first network device determines a second time-frequency resource in a control region of a second beam. The second time-frequency resource comprises at last part of the first time-frequency resource.

In S330, the first network device reduces, on the second time-frequency resource, power for transmitting the control channel to other terminal devices via the second beam. The first beam is a service beam of the first terminal device, and the second beam is a non-service beam potentially interfering with the service beam of the first terminal device.

The control channel transmission method in the embodiments of the present disclosure, the service beam and the non-service beam of the potential interference service beam belong to different network devices. And reducing the power of corresponding time-frequency resource of the non-service beam for transmitting the control channel to other terminal devices, can avoid interference of the non-service beam and can enhance the receiving performance of the control channel.

Optionally, as an embodiment, in S330, the first network device reducing, on the second time-frequency resource, power for transmitting the control channel to other terminal devices via the second beam, may comprise: the first network device reducing, on the second time-frequency resource, the power for transmitting the control channel to other terminal devices to zero. The first network device does not transmit the control channel to the other terminal devices on the second time-frequency resource of the second beam, to avoid interference to the terminal device receiving the control channel.

In the embodiments of the present disclosure, optionally, as shown in FIG. 9, search space configurations of the control region of the first beam and the control region of the second beam are both configured in order of first frequency domain and then time domain, and the first time-frequency resource is at least one control resource unit on first symbol in the control region of the first beam; the second time-frequency resource is at least one control resource unit on the first symbol in the control region of the second beam.

In the embodiments of the present disclosure, optionally, as shown in FIG. 10 and FIG. 11, search space configurations of the control region of the first beam and the control region of the second beam are both configured in order of first time domain and then frequency domain, and the first time-frequency resource is at least one physical resource block (PRB) in the control region of the first beam; the second time-frequency resource is at least one PRB in the control region of the second beam.

Figure 13:
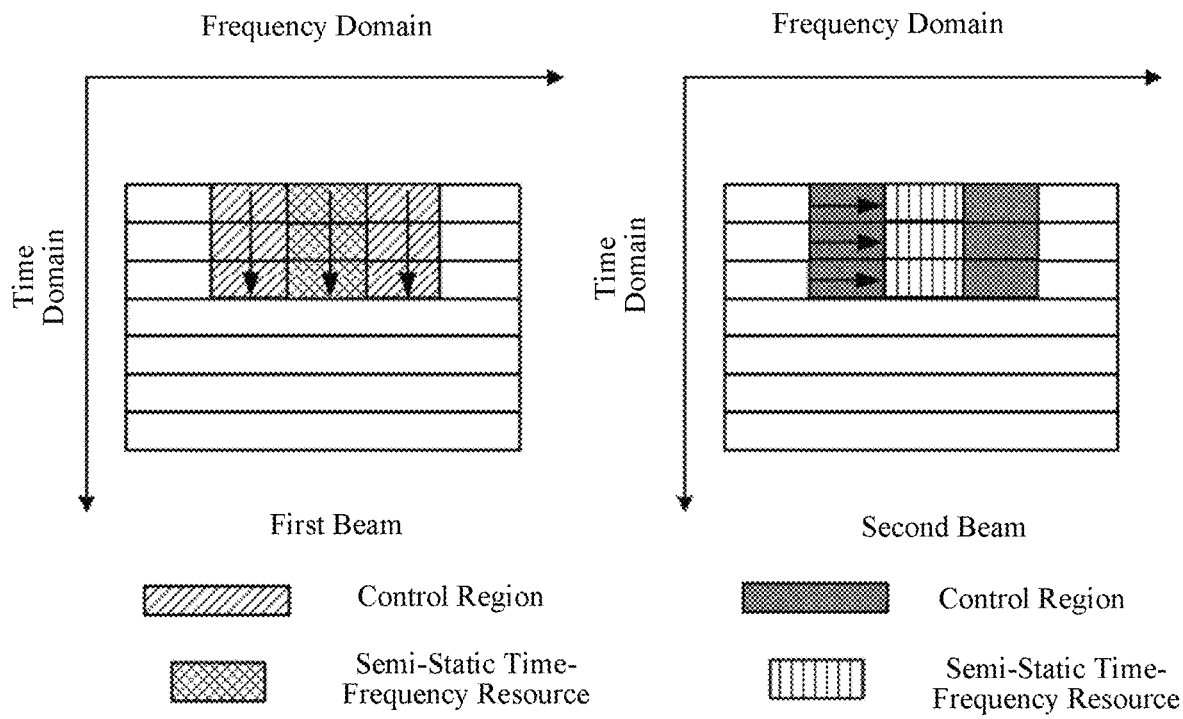
FIG. 13 is a diagram illustrating the control channel transmission method of another embodiment of the present disclosure.

In the embodiments of the present disclosure, optionally, as shown in FIG. 13, a search space configuration of the control region of the first beam is configured in order of first time domain and then frequency domain, a search space configuration the control region of the second beam is configured in order of first frequency domain and then time domain, the first time-frequency resource is at least one physical resource block (PRB) in the control region of the first beam; the second time-frequency resource is at least one PRB in the control region of the second beam.

The service beam of the terminal device, that is, the control region of the first beam (belonging to the second terminal device) is a time-frequency resource block spanning three symbols, and a search space of the control channel is mapped according to the order of first time domain and then frequency domain. The control region of the second beam (belonging to the first terminal device) is further a time-frequency resource block spanning three symbols, and the search space of the control channel is further mapped in order of first frequency domain and then time domain. Thus, as shown in FIG. 13, if the second beam is fully coordinated, the second time-frequency resource may be identical to the first time-frequency resource, or the second time-frequency resource may completely comprise the first time-frequency resource. If the second beam is not fully coordinated, the second time-frequency resource may comprise at least part resources of the first time-frequency resource. In the example shown in FIG. 13, the second time-frequency resource is identical to the first time-frequency resource and both are at least one physical resource block PRB. The first network device reducing, on the second time-frequency resource power for transmitting the control channel to other terminal devices via the second beam, comprises reducing the power to zero.

Figure 14:
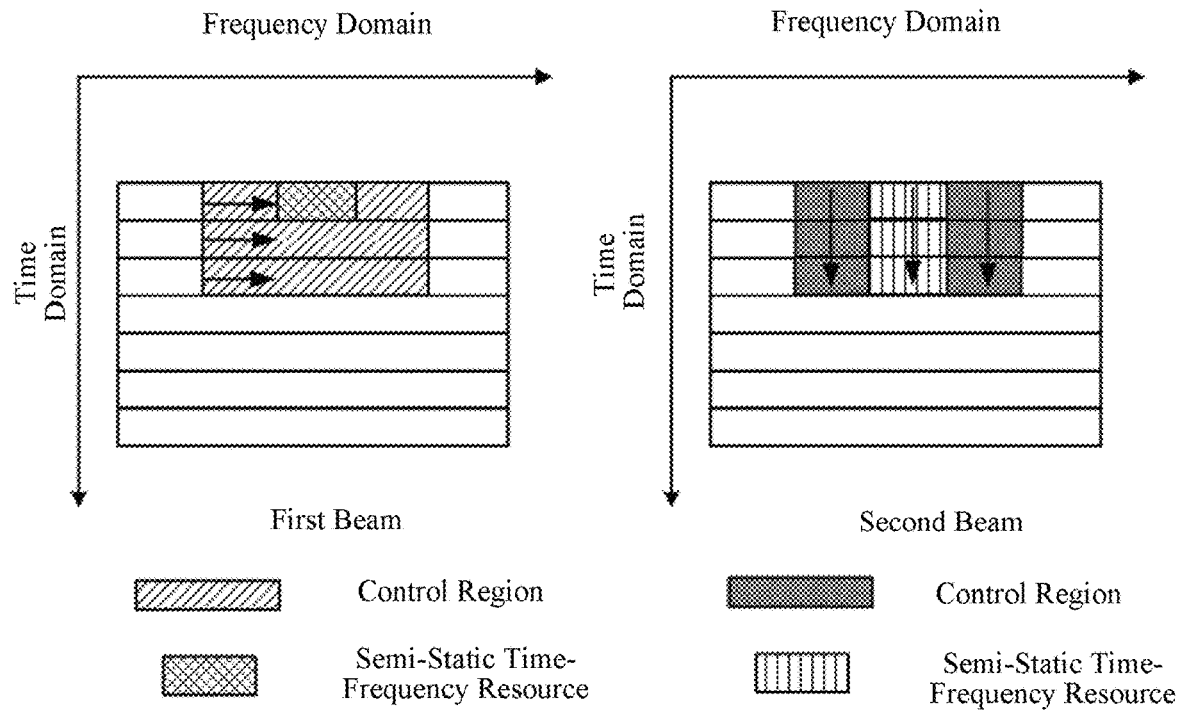
FIG. 14 is a diagram illustrating the control channel transmission method of another embodiment of the present disclosure.

In the embodiments of the present disclosure, optionally, as shown in FIG. 14, a search space configuration of the control region of the first beam is configured in order of first frequency domain and then time domain, a search space configuration the control region of the second beam is configured in order of first time domain and then frequency domain, the first time-frequency resource is at least one physical resource block (PRB) in the control region of the first beam; the second time-frequency resource is at least one PRB in the control region of the second beam.

The service beam of the terminal device, that is, the control region of the first beam (belonging to the second terminal device) is a time-frequency resource block spanning three symbols, and a search space of the control channel is mapped according to the order of first frequency domain and then time domain. The control region of the second beam (belonging to the first terminal device) is further a time-frequency resource block spanning three symbols, and the search space of the control channel is further mapped by the re-time domain and re-frequency domain. Thus, as shown in FIG. 14, if the second beam is fully coordinated, the second time-frequency resource may be identical to the first time-frequency resource, or the second time-frequency resource may completely comprise the first time-frequency resource. If the second beam is not fully coordinated, the second time-frequency resource may comprise at least part resources of the first time-frequency resource. In the example shown in FIG. 14, the second time-frequency resource comprises the first time-frequency resource. The first time-frequency resource is at least one control resource unit in the control region of the first beam, and the second time-frequency resource is at least one PRB that comprises at least one control resource unit. The first network device reducing, on the second time-frequency resource, power for transmitting the control channel to other terminal devices via the second beam, comprises reducing the power to zero.

Figure 15:
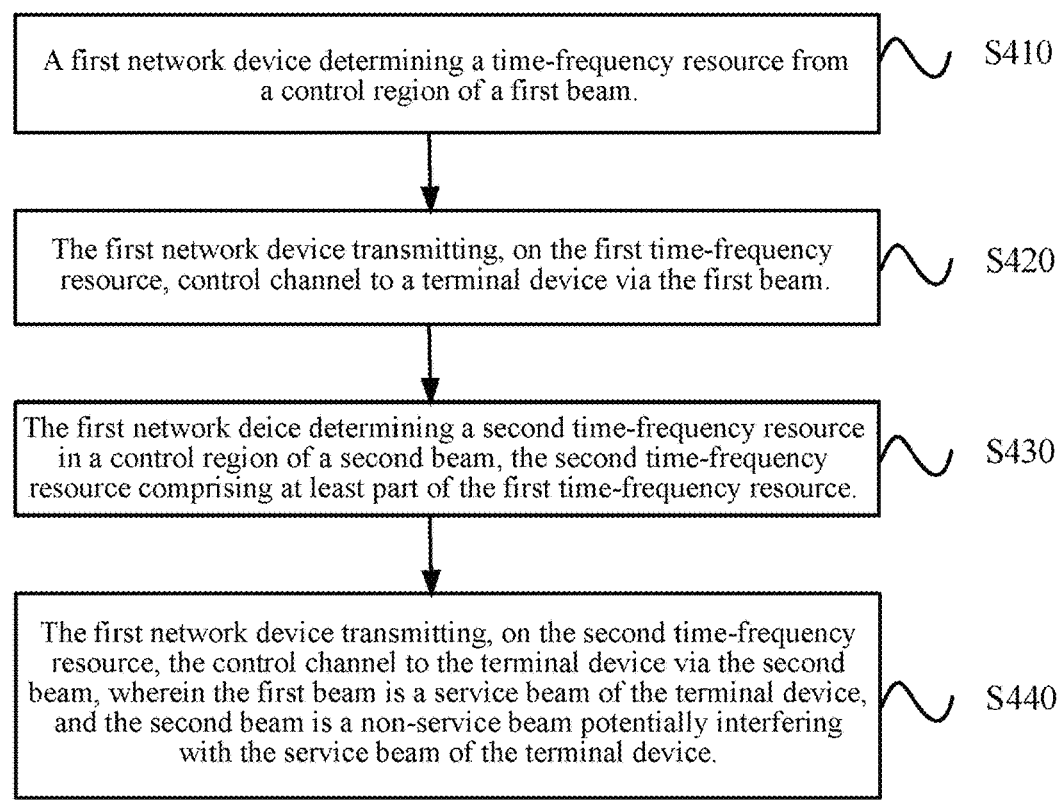
FIG. 15 is a flow chart diagram illustrating the control channel transmission method of another embodiment of the present disclosure.

FIG. 15 is a flow chart diagram illustrating the control channel transmission method 400 of another embodiment of the present disclosure. The method 400 is applicable to the scenario shown in FIG. 5 and is performed by the first network device. The method 400 may comprise the following steps.

In S410, a first network device determines a time-frequency resource from a control region of a first beam.

In S420, the first network device transmits, on the first time-frequency resource, a control channel to a terminal device via the first beam.

In S430, the first network device determines a second time-frequency resource in a control region of a second beam. The second time-frequency resource comprises at least part of the first time-frequency resource.

In S440, the first network device transmits, on the second time-frequency resource, the control channel to the terminal device via the second beam. The first beam is a service beam of the terminal device, and the second beam is a non-service beam potentially interfering with the service beam of the terminal device.

The control channel transmission method in the embodiments of the present disclosure, the service beam and the non-service beam of the potential interference service beam belong to different network devices. And reducing the power of corresponding time-frequency resource of the non-service beam for transmitting the control channel to other terminal devices, can avoid interference of the non-service beam and can enhance the receiving performance of the control channel.

It should be understood that, in the embodiments of the present disclosure, the first beam as the service beam and the second beam as the non-service beam with potential interference belong to one network device, and therefore, relative to the method 200, the interaction between network devices is eliminated. The principle is similar, and will not be described here.

In the embodiments of the present disclosure, optionally, as shown in FIG. 9, search space configurations of the control region of the first beam and the control region of the second beam are both configured in order of first frequency domain and then time domain, and the first time-frequency resource is at least one control resource unit on first symbol in the control region of the first beam; the second time-frequency resource is at least one control resource unit on the first symbol in the control region of the second beam.

In the embodiments of the present disclosure, optionally, as shown in FIG. 10 and FIG. 11, search space configurations of the control region of the first beam and the control region of the second beam are both in order of first time domain and then frequency domain, and the first time-frequency resource is at least one physical resource block (PRB) in the control region of the first beam; the second time-frequency resource is at least one PRB in the control region of the second beam.

Figure 16:
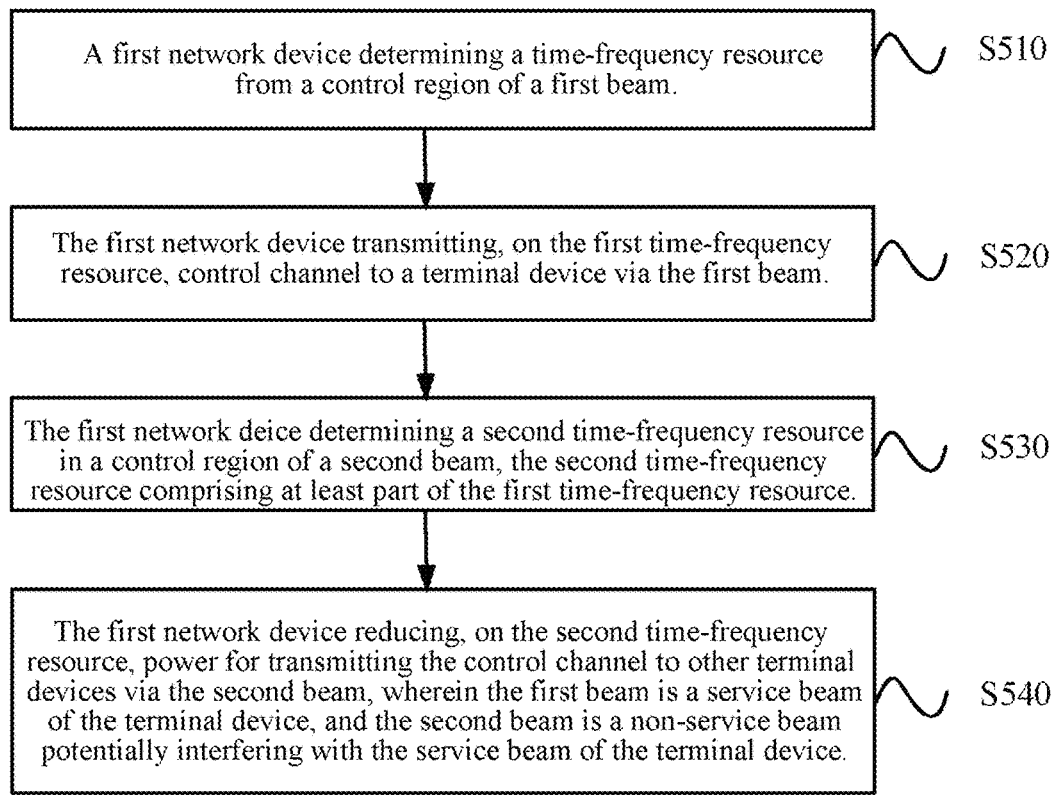
FIG. 16 is a flow chart diagram illustrating the control channel transmission method of another embodiment of the present disclosure.

FIG. 16 is a flow chart diagram illustrating the control channel transmission method 500 of another embodiment of the present disclosure. The method 500 is applicable to the scenario shown in FIG. 5 and is performed by the first network device. The method 500 may comprise the following steps.

In S510, a first network device determines a time-frequency resource from a control region of a first beam.

In S520, the first network device transmits, on the first time-frequency resource, a control channel to a terminal device via the first beam.

In S530, the first network device determines a second time-frequency resource in a control region of a second beam. The second time-frequency resource comprises at least part of the first time-frequency resource.

In S540, the first network device reduces power for transmitting the control channel to other terminal devices via the second beam on the second time-frequency resource. The first beam is a service beam of the terminal device, and the second beam is a non-service beam potentially interfering with the service beam of the terminal device.

The control channel transmission method in the embodiments of the present disclosure, the service beam and the non-service beam of the potential interference service beam belong to different network devices. And reducing the power of corresponding time-frequency resource of the non-service beam for transmitting the control channel to other terminal devices, can avoid interference of the non-service beam and can enhance the receiving performance of the control channel.

It should be understood that, in the embodiments of the present disclosure, the first beam as the service beam and the second beam as the non-service beam with potential interference belong to one network device, and therefore, relative to the method 300, the interaction between network devices is eliminated. The principle is similar, and will not be described here.

Optionally, as an embodiment, in S530, the first network device reducing, on the second time-frequency resource, power for transmitting the control channel to other terminal devices via the second beam, may comprise: the first network device reducing, on the second time-frequency resource, the power for transmitting the control channel to other terminal devices to zero.

In the embodiments of the present disclosure, optionally, as shown in FIG. 9, search space configurations of the control region of the first beam and the control region of the second beam are both configured in order of first frequency domain and then time domain, and the first time-frequency resource is at least one control resource unit on first symbol in the control region of the first beam; the second time-frequency resource is at least one control resource unit on the first symbol in the control region of the second beam.

In the embodiments of the present disclosure, optionally, as shown in FIG. 10 and FIG. 11, search space configurations of the control region of the first beam and the control region of the second beam are both in order of first time domain and then frequency domain, and the first time-frequency resource is at least one physical resource block (PRB) in the control region of the first beam; the second time-frequency resource is at least one PRB in the control region of the second beam.

In the embodiments of the present disclosure, optionally, as shown in FIG. 13, a search space configuration of the control region of the first beam is in order of first time domain and then frequency domain, a search space configuration the control region of the second beam is configured in order of first frequency domain and then time domain, the first time-frequency resource is at least one physical resource block (PRB) in the control region of the first beam; the second time-frequency resource is at least one PRB in the control region of the second beam.

In the embodiments of the present disclosure, optionally, as shown in FIG. 14, the search space configuration of the control region of the first beam is configured in order of first frequency domain and then time domain, the search space configuration the control region of the second beam is in order of first time domain and then frequency domain, the first time-frequency resource is at least one control resource unit in the control region of the first beam; the second time-frequency resource is at least one physical resource block (PRB) comprising at least one control resource unit.

Figure 17:
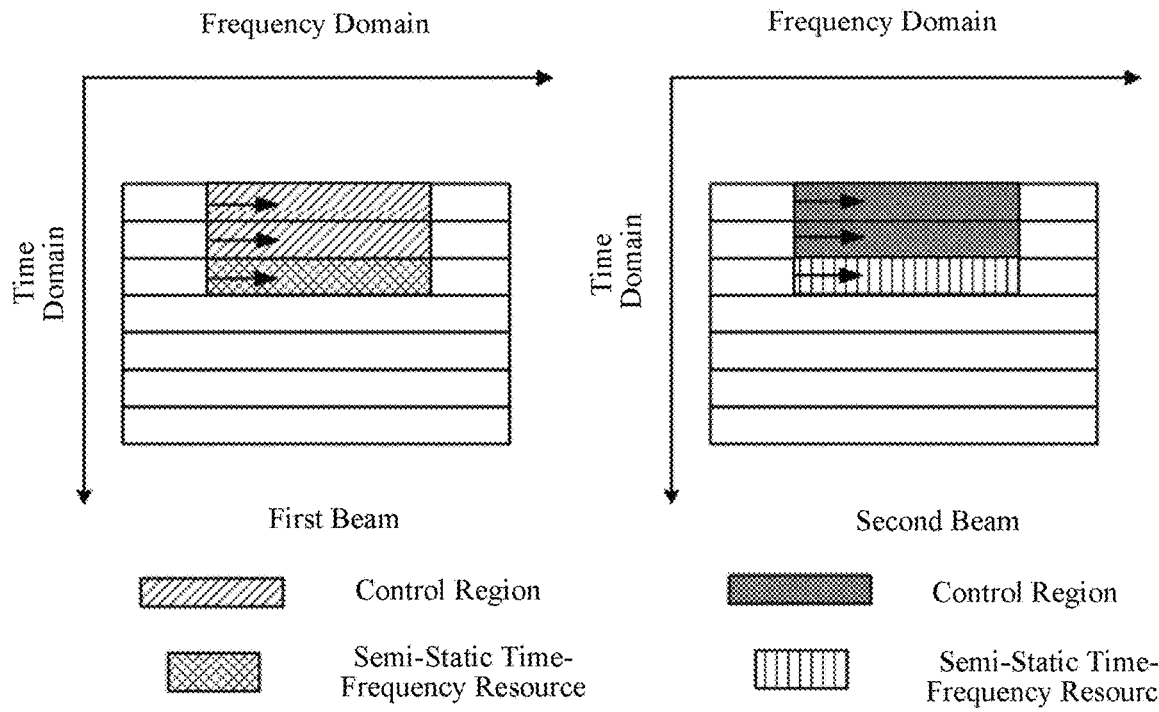
FIG. 17 is a diagram illustrating the control channel transmission method of another embodiment of the present disclosure.

It should be understood that FIG. 9, FIG. 10, FIG. 11, FIG. 13, and FIG. 14 are all described by using a network device to dynamically allocate a first time-frequency resource and a second time-frequency resource. In the embodiments of the present disclosure, when there are more coordinated control channels to be coordinated, the first time-frequency resource and the second time-frequency resource may also be allocated in a semi-static manner. As shown in FIG. 17, when the search space configurations of the control region of the first beam and the control region of the second beam are both configured in order of first frequency domain and then time domain, One or more OFDM symbols may be reserved in the control region of the first beam and the control region of the second beam may be used first for coordinating the control channels. Or, as shown in FIG. 18, when the search space configurations of the control region of the first beam and the control region of the second beam are both configured in order of first time domain and then frequency domain, one or more sets of PRBs may be reserved in the control region of the first beam and the control of the second beam for coordinating the control channels.

FIG. 19 is a flow chart diagram illustrating the control channel transmission method 600 of another embodiment of the present disclosure. Method 600 is performed by a terminal device. The method 600 may comprise the following steps.

In S610, a terminal device acquires configuration information of a first time-frequency resource. The first time-frequency resource is a source in a control region of a service beam.

In S620, the terminal device receives control channel according to the configuration information. The control channel is transmitted from a network device on the first time-frequency resource via a first beam and on a second time-frequency resource via a second beam. The first time-frequency resource is the resource in the control region of the first beam, and the second time-frequency resource is the resource in the control region of the second beam. The second time-frequency resource comprises at least part of the first time-frequency resource. The first beam is a service beam of the terminal device, and the second beam is a non-service beam potentially interfering with the service beam of the terminal device.

The control channel transmission method in the embodiments of the present disclosure, by using corresponding time-frequency resource of the non-serving beam to assist the service beam to transmit the control channel, not only the interference of the non-serving beam may be avoided, but further the joint transmission may be realized, and the reception performance of the control channel may be enhanced.

Wherein, the configuration information that the terminal device acquires from the first time-frequency resource may be configuration information that is transmitted from the receiving network device to the terminal device, or may be determined according to a protocol, or by using a feature ID of the terminal device and other parameters, and the embodiments of the present disclosure do not limit this.

Optionally, as an embodiment, the first beam and the second beam are different beams of same network device.

Optionally, in the present embodiment, the control channel is transmitted from the same network device, based on configuration of same demodulation reference signal, on the first time-frequency resource via the first beam and on the second time-frequency resource via the second beam, respectively.

Optionally, as another embodiment, the first beam and the second beam are beams of different network devices.

Optionally, in the present embodiment, the control channel is transmitted from the different network devices, based on configuration of the same demodulation reference signal, on the first time-frequency resource via the first beam and on the second time-frequency resource via the second beam, respectively.

It should be understood that in various embodiments of the present disclosure, the size of the serial numbers of the various processes described above does not imply a sequence of executions. The order of execution of the various processes should be determined by their function and internal logic, and should not be construed as limiting the implementation of the embodiments of the present disclosure.

The method of transmitting a signal according to the embodiments of the present disclosure has been described in detail above, and a network device and a terminal device according to the embodiments of the present disclosure will be described below. It should be understood that the network device and the terminal device of the embodiments of the present disclosure may perform various methods of foregoing embodiments of the present disclosure. That is, for the specific working process of the following various devices, reference may be made to the corresponding process in the foregoing embodiments.

Figure 20:
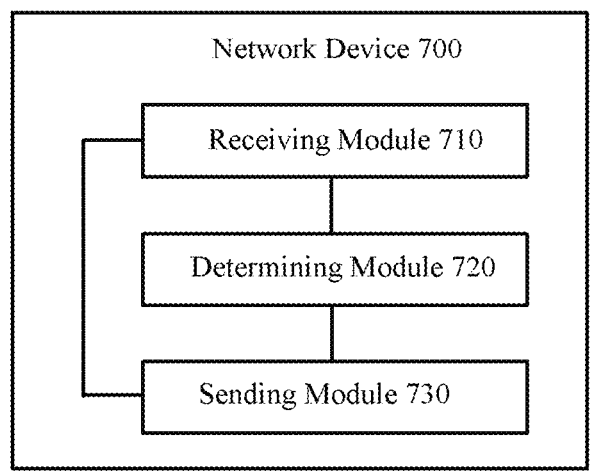
FIG. 20 is a block diagram illustrating the network device of one embodiment of the present disclosure.

FIG. 20 is a block diagram illustrating the network device 700 of one embodiment of the present disclosure. The network device 700 is the first network device. As shown in FIG. 20, the network device 700 comprises the following modules.

A receiving module 710 is configured to receive first information, which is transmitted from a second network device. The first information comprises information for indicating a first time-frequency resource. The first time-frequency resource is determined by the second network device from a control region of a first beam, and is used for transmitting a resource of the control channel to a first terminal device;

A determining module 720 is configured to determine a second time-frequency resource in a control region of a second beam, the second time-frequency resource comprising at least part of the first time-frequency resource;

The receiving module 710 is further configured to receive second information transmitted from the second network device, the second information comprising a control channel;

A transmitting module 730 is configured to transmit, on the second time-frequency resource, the control channel to the first terminal device via the second beam. The first beam is a service beam of the first terminal device, and the second beam is a non-service beam potentially interfering with the service beam of the first terminal device.

According to the network device of the embodiments of the present disclosure, the service beam and a non-service beam potentially interfering with the service beam belong to different network device. By using corresponding time-frequency resource of the non-serving beam to assist the service beam to transmit the control channel, not only the interference of the non-serving beam may be avoided, but further the joint transmission may be realized, and the reception performance of the control channel may be enhanced.

Optionally, as an embodiment, search space configurations of the control region of the first beam and the control region of the second beam are both configured in order of first frequency domain and then time domain, and the first time-frequency resource is at least one control resource unit on first symbol in the control region of the first beam; the second time-frequency resource is at least one control resource unit on the first symbol in the control region of the second beam.

Optionally, as an embodiment, search space configurations of the control region of the first beam and the control region of the second beam are both configured in order of first time domain and then frequency domain, and the first time-frequency resource is at least one physical resource block (PRB) in the control region of the first beam; the second time-frequency resource is at least one PRB in the control region of the second beam.

Optionally, as an embodiment, the second information further comprises configuration information used by the second network device to transmit demodulation reference signal. The transmitting module 730 is configured to: transmit according to the configuration information sent, on the second time-frequency resource, the demodulation reference signal of the control channel to the first terminal device via the second beam.

Optionally, as an embodiment, the determining module 720 is further configured to determine a third time-frequency resource from the control region of the second beam; the transmitting module 730 is further configured to transmit third information to a third network device, and the third network device comprises information for indicating a third time-frequency resource, so that the third network device assists the second beam to transmit the control channel to a second terminal device on a fourth time-frequency resource in the control region of a third beam, the fourth time-frequency resource comprises at least part of the third time-frequency resource; and the transmitting module 730 is further configured to transmit, on the third time-frequency resource, the control channel to the second terminal device via the third beam.

Figure 21:
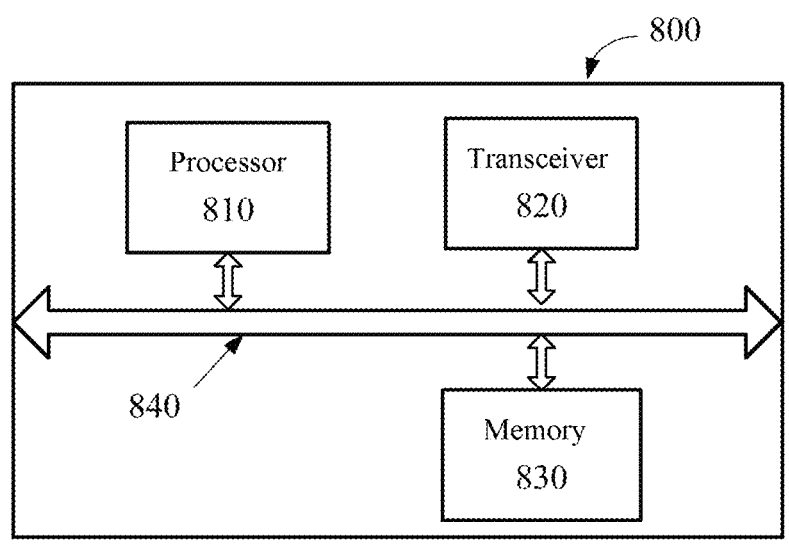
FIG. 21 is a block diagram illustrating the network device of another embodiment of the present disclosure.

It should be noted that, in the embodiments of the present disclosure, the receiving module 710 and the transmitting module 730 may be implemented by a transceiver, and the determining module 720 may be implemented by a processor. As shown in FIG. 21, network device 800 may comprise a processor 810, a transceiver 820, and a memory 830. Among them, the memory 830 may be used to store code executed by the processor 810, etc.

The various components in the network device 800 are coupled together by a bus system 840. The bus system 840 further comprises, in addition to the data bus, a power bus, a control bus, and a status signal bus.

The network device 800 shown in FIG. 21 or the network device 700 shown in FIG. 20 can implement the various processes implemented by foregoing method 200. To avoid repetition, details are not described herein again.

It should be noted that above described embodiments of the present disclosure may be applied to a processor or implemented by a processor. The processor may be an integrated circuit chip with signal processing capabilities. In the implementation process, each step of the foregoing embodiments may be completed by an integrated logic circuit of hardware in a processor or an instruction in a form of software. The processor may be a general-purpose processor, a digital signal processor (DSP), an application specific integrated circuit (ASIC), a field programmable gate array (FPGA), or other programming logic devices, discrete gates or transistor logic devices, discrete hardware components. The methods, steps, and logical block diagrams disclosed in the embodiments of the present disclosure may be implemented or carried out. The general purpose processor may be a microprocessor or the processor may be any conventional processor. The steps of the methods disclosed in connection with the embodiments of the present disclosure may be directly embodied by the completion of the hardware decoding processor. Or the completion of the combination of hardware and software modules in the decoding processor. The software module can be located in a conventional storage medium such as random access memory, flash memory, read only memory, programmable read only memory or electrically erasable programmable memory, registers, and other mature storage media in the technical field. The storage medium is located in the memory. The processor reads the information in the memory and combines its hardware to complete the steps of above methods.

It can be understood that the memory in the embodiments of the present disclosure may be a volatile memory or a non-volatile memory. Or both volatile and non-volatile memory can be comprised. The non-volatile memory may be a read-only memory (ROM), a programmable read only memory (PROM), an erasable programmable read only memory (Erasable PROM, EPROM), or an electric erase programmable read only memory (EEPROM) or flash memory. The volatile memory can be a Random Access Memory (RAM) that acts as an external cache. By way of illustrative but not restrictive illustrations, many forms of RAM are available, such as static random access memory (SRAM), dynamic random access memory (DRAM), synchronous dynamic random access memory (SDRAM), double data rate SDRAM (DDR SDRAM), enhanced synchronous dynamic random access memory (ESDRAM), synchronous connection dynamic random access memory (SLDRAM)) and direct memory bus random access memory (DR RAM). It should be noted that the memories of the systems and methods described herein are intended to comprise, without being limited to, these and any other suitable types of memory.

The embodiments of the present disclosure further provide a network device (that is, a first network device). The structure of the network device is similar to the network device 700 shown in FIG. 20, and comprises a receiving module, a determining module, and a transmitting module.

A receiving module is configured to receive first information, which is transmitted from a second network device, the first information comprising information for indicating a first time-frequency resource. The first time-frequency resource is determined by the second network device from a control region of a first beam, and is used for transmitting a resource of the control channel to a first terminal device.

A determining module is configured to determine a second time-frequency resource in a control region of a second beam, the second time-frequency resource comprising at least part of the first time-frequency resource.

A transmitting module is configured to reduce, on the second time-frequency resource, power for transmitting the control channel to other terminal devices via the second beam. The first beam is a service beam of the first terminal device, and the second beam is a non-service beam potentially interfering with the service beam of the first terminal device.

According to the network device of the embodiments of the present disclosure, the service beam and a non-service beam potentially interfering with the service beam belong to different network device. Reducing the power of corresponding time-frequency resource of the non-service beam for transmitting the control channel to other terminal devices, not only the interference of the non-serving beam may be avoided, but also the reception performance of the control channel may be enhanced.

Optionally, as an embodiment, the transmitting module is configured to: reduce, on the second time-frequency resource, the power for transmitting the control channel to other terminal devices to zero.

Optionally, as an embodiment, search space configurations of the control region of the first beam and the control region of the second beam are both configured in order of first frequency domain and then time domain, and the first time-frequency resource is at least one control resource unit on first symbol in the control region of the first beam; the second time-frequency resource is at least one control resource unit on the first symbol in the control region of the second beam.

Optionally, as an embodiment, search space configurations of the control region of the first beam and the control region of the second beam are both configured in order of first time domain and then frequency domain, and the first time-frequency resource is at least one physical resource block (PRB) in the control region of the first beam; the second time-frequency resource is at least one PRB in the control region of the second beam.

Optionally, as an embodiment, a search space configuration of the control region of the first beam is configured in order of first time domain and then frequency domain, a search space configuration the control region of the second beam is configured in order of first frequency domain and then time domain, the first time-frequency resource is at least one physical resource block (PRB) in the control region of the first beam; the second time-frequency resource is at least one PRB in the control region of the second beam.

Optionally, as an embodiment, the search space configuration of the control region of the first beam is configured in order of first frequency domain and then time domain, the search space configuration the control region of the second beam is configured in order of first time domain and then frequency domain, the first time-frequency resource is at least one control resource unit in the control region of the first beam; the second time-frequency resource is at least one physical resource block (PRB) comprising at least one control resource unit.

It should be noted that, in the embodiments of the present disclosure, the receiving module and the transmitting module may be implemented by a transceiver, and the determining module may be implemented by a processor. That is, the structure of the network may be as shown in the network 800 shown in FIG. 21, and may further comprise a processor, a transceiver, and a memory. The memory may be used to store code executed by the processor, etc.

The various components in the network device are coupled together by a bus system. The bus system further comprises, in addition to the data bus, a power bus, a control bus, and a status signal bus.

The network device can implement the various processes implemented in the foregoing method 300. To avoid repetition, details are not described herein again.

Figure 22:
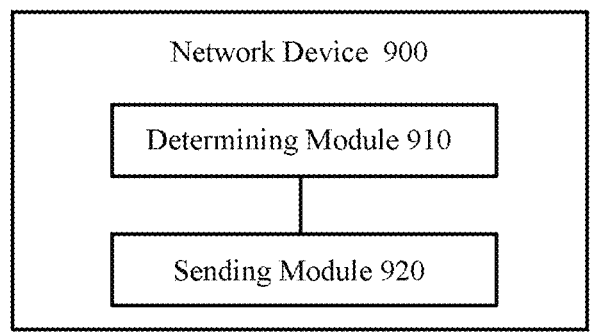
FIG. 22 is a block diagram illustrating the network device of another embodiment of the present disclosure.

FIG. 22 is a block diagram illustrating the network device of another embodiment of the present disclosure. The network device 900 is the first network device. As shown in FIG. 22, the network device 900 comprises the following modules.

A determining module 910 is configured to determine a time-frequency resource from a control region of a first beam.

A transmitting module 920 is configured to transmit, on the first time-frequency resource, control channel to a terminal device via the first beam.

The determining module 910 is further configured to determine a second time-frequency resource in a control region of a second beam, the second time-frequency resource comprising at least part of the first time-frequency resource;

The transmitting module 920 is further configured to transmit, on the second time-frequency resource, the control channel to the terminal device via the second beam. The first beam is a service beam of the terminal device, and the second beam is a non-service beam potentially interfering with the service beam of the terminal device.

According to the network device of the embodiments of the present disclosure, the service beam and a non-service beam potentially interfering with the service beam belong to different network device. By using corresponding time-frequency resource of the non-serving beam to assist the service beam to transmit the control channel, not only the interference of the non-serving beam may be avoided, but further the joint transmission may be realized, and the reception performance of the control channel may be enhanced.

Optionally, as an embodiment, search space configurations of a control region of the first beam and a control region of the second beam are both configured in order of first frequency domain and then time domain, and the first time-frequency resource is at least one control resource unit on first symbol in the control region of the first beam; the second time-frequency resource is at least one control resource unit on the first symbol in the control region of the second beam.

Optionally, as an embodiment, search space configurations of the control region of the first beam and the control region of the second beam are both configured in order of first time domain and then frequency domain, and the first time-frequency resource is at least one physical resource block (PRB) in the control region of the first beam; the second time-frequency resource is at least one PRB in the control region of the second beam.

Figure 23:
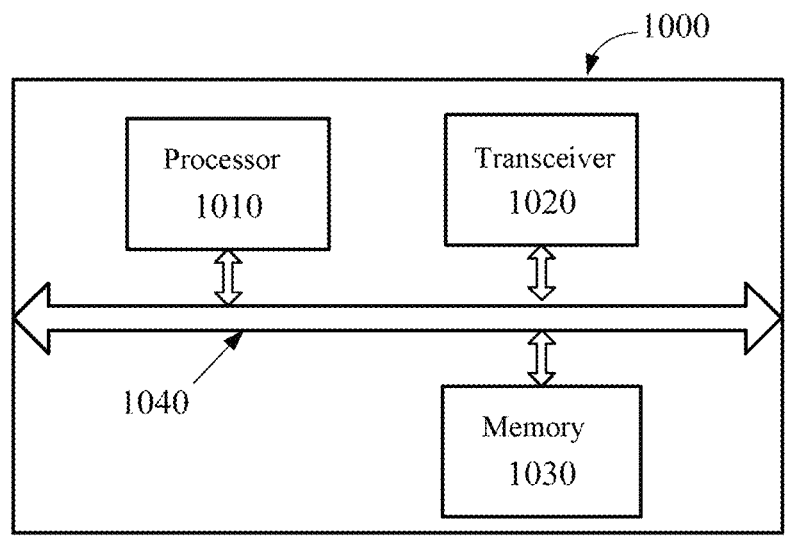
FIG. 23 is a block diagram illustrating the network device of another embodiment of the present disclosure.

It should be noted that, in the embodiments of the present disclosure, the transmitting module 920 may be implemented by a transceiver, and the determining module 910 may be implemented by a processor. As shown in FIG. 23, network device 1000 may comprise a processor 1010, a transceiver 1020, and a memory 1030. The memory 1030 may be used to store code executed by the processor 1010, etc.

The various components in the network device 1000 are coupled together by a bus system 1040. The bus system 1040 further comprises, in addition to the data bus, a power bus, a control bus, and a status signal bus.

The network device 1000 shown in FIG. 23 or the network device 900 shown in FIG. 22 can implement the various processes implemented by foregoing method 400. To avoid repetition, details are not described herein again.

The embodiments of the present disclosure further provide a network device (that is, a first network device). The structure of the network device is similar to the network device 900 shown in FIG. 22, and comprises a determining module and a transmitting module.

A determining module is configured to determine a time-frequency resource from a control region of a first beam.

A transmitting module is configured to transmit, on the first time-frequency resource, control channel to a terminal device via the first beam.

The determining module is further configured to determine a second time-frequency resource in a control region of a second beam, the second time-frequency resource comprising at least part of the first time-frequency resource.

The transmitting module is further configured to reduce, on the second time-frequency resource, power for transmitting the control channel to other terminal devices via the second beam. The first beam is a service beam of the terminal device, and the second beam is a non-service beam potentially interfering with the service beam of the terminal device.

According to the network device of the embodiments of the present disclosure, the service beam and a non-service beam potentially interfering with the service beam belong to different network device. Reducing the power of corresponding time-frequency resource of the non-service beam for transmitting the control channel to other terminal devices, not only the interference of the non-serving beam may be avoided, but also the reception performance of the control channel may be enhanced.

Optionally, as an embodiment, the transmitting module is used for: reducing, on the second time-frequency resource, the power for transmitting the control channel to other terminal devices to zero.

Optionally, as an embodiment, search space configurations of the control region of the first beam and the control region of the second beam are both configured in order of first frequency domain and then time domain, and the first time-frequency resource is at least one control resource unit on first symbol in the control region of the first beam; the second time-frequency resource is at least one control resource unit on the first symbol in the control region of the second beam.

Optionally, as an embodiment, search space configurations of the control region of the first beam and the control region of the second beam are both configured in order of first time domain and then frequency domain, and the first time-frequency resource is at least one physical resource block (PRB) in the control region of the first beam; the second time-frequency resource is at least one PRB in the control region of the second beam.

Optionally, as an embodiment, a search space configuration of the control region of the first beam is configured in order of first time domain and then frequency domain, a search space configuration the control region of the second beam is configured in order of first frequency domain and then time domain, the first time-frequency resource is at least one physical resource block (PRB) in the control region of the first beam; the second time-frequency resource is at least one PRB in the control region of the second beam.

Optionally, as an embodiment, the search space configuration of the control region of the first beam is configured in order of first frequency domain and then time domain, the search space configuration the control region of the second beam is configured in order of first time domain and then frequency domain, the first time-frequency resource is at least one control resource unit in the control region of the first beam; the second time-frequency resource is at least one physical resource block (PRB) comprising at least one control resource unit.

It should be noted that, in the embodiments of the present disclosure, the receiving module and the transmitting module may be implemented by a transceiver, and the determining module may be implemented by a processor. That is, the structure of the network may be as shown in the network 1000 shown in FIG. 23, and may further comprise a processor, a transceiver, and a memory. The memory may be used to store code executed by the processor, etc.

The various components in the network device are coupled together by a bus system. The bus system further comprises, in addition to the data bus, a power bus, a control bus, and a status signal bus.

The network device can implement the various processes implemented in the foregoing method 500. To avoid repetition, details are not described herein again.

Figure 24:
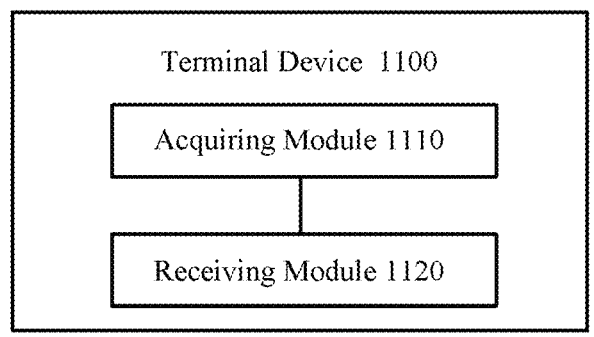
FIG. 24 is a block diagram illustrating the terminal device of one embodiment of the present disclosure.

FIG. 24 is a block diagram illustrating the terminal device 1100 of one embodiment of the present disclosure. As shown in FIG. 20, the terminal device 1100 comprises the following modules.

An acquiring module 1110 is configured to acquire configuration information of a first time-frequency resource. The first time-frequency resource is a source in a control region of a service beam.

A receiving module 1120 is configured to receive control channel according to the configuration information. The control channel is transmitted from a network device on the first time-frequency resource via a first beam and on a second time-frequency resource via a second beam, and the first time-frequency resource is the resource in the control region of the first beam, the second time-frequency resource is the resource in the control region of the second beam, the second time-frequency resource comprising at least part of the first time-frequency resource. The first beam is a service beam of the terminal device, and the second beam is a non-service beam potentially interfering with the service beam of the terminal device.

According to the terminal device of the embodiments of the present disclosure, by using corresponding time-frequency resource of the non-serving beam to assist the service beam to transmit the control channel, not only the interference of the non-serving beam may be avoided, but further the joint transmission may be realized, and the reception performance of the control channel may be enhanced.

Optionally, as an embodiment, the first beam and the second beam are different beams of same network device.

Optionally, as an embodiment, the control channel is transmitted from the same network device, based on configuration of same demodulation reference signal, on the first time-frequency resource via the first beam and on the second time-frequency resource via the second beam, respectively.

Optionally, as an embodiment, the first beam and the second beam are beams of different network devices.

Optionally, as an embodiment, the control channel is transmitted from the different network devices, based on configuration of the same demodulation reference signal, on the first time-frequency resource via the first beam and on the second time-frequency resource via the second beam, respectively.

Figure 25:
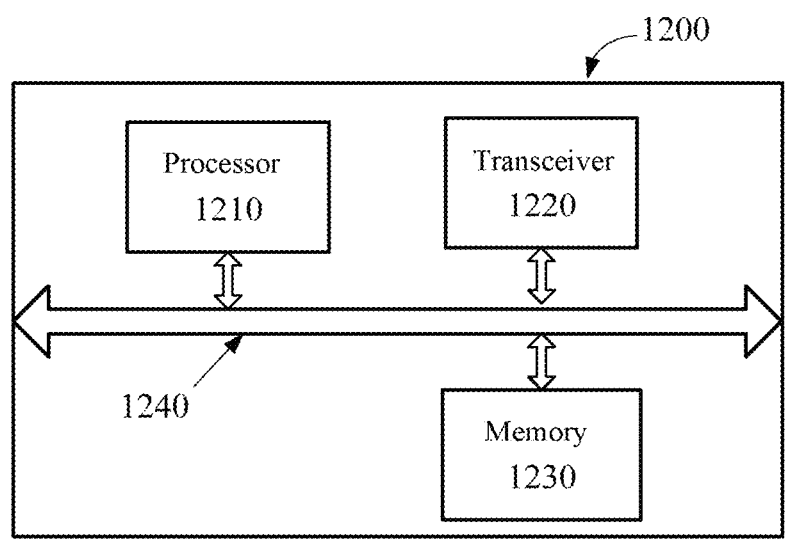
FIG. 25 is a block diagram illustrating the terminal device of another embodiment of the present disclosure.

It should be noted that, in the embodiments of the present disclosure, the receiving module 1120 may be implemented by a transceiver, and the acquiring module 1110 may be implemented by a processor. As shown in FIG. 25, terminal device 1200 may comprise a processor 1210, a transceiver 1220, and a memory 1230. The memory 1230 may be used to store code executed by the processor 1210, etc.

The various components in the network device 1200 are coupled together by a bus system 1240. The bus system 1240 further comprises, in addition to the data bus, a power bus, a control bus, and a status signal bus.

The terminal device 1200 shown in FIG. 25 or the network device 1100 shown in FIG. 24 can implement the various processes implemented by foregoing methods. To avoid repetition, details are not described herein again.

It should be understood that the specific examples in the embodiments of the present application are only intended to help those skilled in the art to better understand the embodiments of the present application. It is not intended to limit the scope of the embodiments of the present application.

It should be understood that in the embodiments of the present application, the term "and/or" is merely an association relationship describing an associated object, indicating that there may be three relationships. For example, A and/or B may indicate that there are three cases: A existing alone, and A and B existing together, and B existing alone. In addition, the character "/" in this article generally indicates that the contextual object is an "or" relationship.

Those ordinary skilled in the art should be appreciated that, the units and algorithm steps described in conjunction with the embodiments disclosed by the present disclosure can be implemented in electronic hardware, computer software or a combination of computer software and electronic hardware. Whether these functions are to be performed in the form of hardware or software is depending on specific applications and constraint conditions for design of the technical solutions. Those ordinary skilled in the art can use different method for each of the specific applications so as to achieve the described functions, but such implementation should not be considered as going beyond the scope of the present disclosure.

Those skilled pertaining to the art will be clearly appreciated that, in order for convenience and concision of explanation, particular working processes of the system(s), device(s) and unit(s) described above can be referred to corresponding processes in the foregoing embodiments of the transmission method without repeating herein.

In several embodiments provided by the present disclosure, it should be understood that, the revealed system(s), device(s) and method(s) can be implemented in other ways. For example, the foregoing embodiments of the transmission method are merely illustrative. For example, the partition of the units merely is a partition in terms of logic functions, and there can be other partitions in practical implementation. For example, multiple units or components can be combined or integrated into another system, or some features can be omitted or may not be performed. Furthermore, the terms "coupling", "direct coupling" or "communication connection" as revealed or discussed between objects can be indirect coupling or communication connection through several ports, devices or units, and can further be electric connection, mechanic connection or other forms of connection.

The units described as separate parts may or may not be separated physically. The part present as a unit may or may not be a physical unit, that is, it can be located in a single position or can be distributed in multiple network units. Part or all of the units can be selected according to actual demands, so as to achieve the objective of the technical solutions of the present disclosure.

Furthermore, the functional units in the embodiments of the present disclosure can be integrated in a single processing unit, and can further be present separately and physically, and can further be the case where two or more than two units are integrated in one unit.

The function, when implemented in a form of software functional unit and marketed or used as an independent product, can be stored in a computer-readable storage medium. Based on such understanding, the essence of the technical solutions of the present disclosure or a part of the technical solutions contributing to the existing technology, or all of or part of the technical solutions can be embodied in a form of software product. The software product is stored in a storage medium, including several instructions to cause a computer device (the computer device can be a personal computer, a server or a network device) to perform all or part of the steps of the transmission method described in the embodiments of the present disclosure. Furthermore, the foregoing storage medium comprises various types of mediums which can store program codes, for example, USB flash disk, mobile Hard Disk Drive (HDD), Read-Only Memory (ROM), Random Access Memory (RAM), magnetic disk, optical disk and the like.

The above are merely specific implementations of the present disclosure without limiting the protection scope of the present disclosure thereto. Within the technical scope revealed in the present disclosure, modification(s) or substitution(s) may be easily conceivable for those skilled who are familiar with the present technical field, and these modification(s) and substitution(s) all should be contained in the protection scope of the present disclosure. Therefore the protection scope of the present disclosure should be based on the protection scope of the appended claims.

What is claimed is:

1. A control channel transmission method, comprising:
   receiving, by a first network device, first information, which is transmitted from a second network device, the first information comprising information for indicating a first time-frequency resource, wherein the first time-frequency resource is determined by the second network device from a control region of a first beam, and is used for transmitting a resource of a control channel to a first terminal device;
   determining, by the first network device, a second time-frequency resource in a control region of a second beam, the second time-frequency resource comprising at least part of the first time-frequency resource;
   receiving, by the first network device, second information transmitted from the second network device, the second information comprising the control channel;
   transmitting, by the first network device, on the second time-frequency resource, the control channel to the first terminal device via the second beam, wherein the first beam is a service beam of the first terminal device, and the second beam is a non-service beam potentially interfering with the service beam of the first terminal device;
   wherein the second information further comprises configuration information used by the second network device to transmit demodulation reference signal; and
   wherein, transmitting, by the first network device, on the second time-frequency resource, the control channel to the first terminal device, comprising:
      transmitting, by the first network device, according to the configuration information transmits, on the second time-frequency resource, the demodulation reference signal of the control channel to the first terminal device via the second beam.

2. The method of claim 1, wherein search space configurations of the control region of the first beam and the control region of the second beam are both configured in order of first frequency domain and then time domain, and wherein the first time-frequency resource is at least one control resource unit on first symbol in the control region of the first beam; and the second time-frequency resource is at least one control resource unit on the first symbol in the control region of the second beam.

3. The method of claim 1, wherein search space configurations of the control region of the first beam and the control region of the second beam are both configured in order of first time domain and then frequency domain, and wherein the first time-frequency resource is at least one physical resource block (PRB) in the control region of the first beam; and the second time-frequency resource is at least one PRB in the control region of the second beam.

4. The method of claim 1, further comprising:
   determining, by the first network device, a third time-frequency resource from the control region of the second beam;
   transmitting, by the first network device, third information to a third network device, the third network device comprising information for indicating a third time-frequency resource, so that the third network device assists the second beam to send the control channel to a second terminal device on a fourth time-frequency resource in the control region of a third beam, the fourth time-frequency resource comprising at least part of the third time-frequency resource;
   transmitting, by the first network device, on the third time-frequency resource, the control channel to the second terminal device via the third beam.

5. A control channel transmission method, comprising:
   acquiring, by a terminal device, configuration information of a first time-frequency resource, wherein the first time-frequency resource is a source in a control region of a service beam;
   receiving, by the terminal device, a control channel according to the configuration information, wherein the control channel is transmitted from a network device on the first time-frequency resource via a first beam and on a second time-frequency resource via a second beam, and wherein the first time-frequency resource is the resource in the control region of the first beam, and the second time-frequency resource is the resource in the control region of the second beam, the second time-frequency resource comprising at least part of the first time-frequency resource, and wherein the first beam is a service beam of the terminal device, and the second beam is a non-service beam potentially interfering with the service beam of the terminal device;
   wherein the first beam and the second beam are different beams of a same network device, and the control channel is transmitted from the same network device, based on configuration of same demodulation reference signal, on the first time-frequency resource via the first beam and on the second time-frequency resource via the second beam, respectively; or wherein the first beam and the second beam are beams of different network devices, and the control channel is transmitted from the different network devices, based on configuration of the same demodulation reference signal, on the first time-frequency resource via the first beam and on the second time-frequency resource via the second beam, respectively.

6. A network device, comprising:

a transceiver configured to receive first information, which is transmitted from a second network device, the first information comprising information for indicating a first time-frequency resource, wherein the first time-frequency resource is determined by the second network device from a control region of a first beam, and is used for transmitting a resource of the control channel to a first terminal device;

a processor configured to determine a second time-frequency resource in a control region of a second beam, the second time-frequency resource comprising at least part of the first time-frequency resource;

wherein the transceiver is further configured to receive second information transmitted from the second network device, the second information comprising the control channel; and wherein the transceiver is further configured to transmit, on the second time-frequency resource, the control channel to the first terminal device via the second beam, wherein the first beam is a service beam of the first terminal device, and the second beam is a non-service beam potentially interfering with the service beam of the first terminal device;

wherein the second information further comprises configuration information used by the second network device to transmit demodulation reference signal; and wherein the transmitting module is specifically configured to:

transmit, according to the configuration information sent, on the second time-frequency resource, the demodulation reference signal of the control channel to the first terminal device via the second beam.

7. The network device of claim 6, wherein search space configurations of the control region of the first beam and the control region of the second beam are both configured in order of first frequency domain and then time domain, and wherein the first time-frequency resource is at least one control resource unit on first symbol in the control region of the first beam; and the second time-frequency resource is at least one control resource unit on the first symbol in the control region of the second beam.

8. The network device of claim 6, wherein search space configurations of the control region of the first beam and the control region of the second beam are both configured in order of first time domain and then frequency domain, and wherein the first time-frequency resource is at least one physical resource block (PRB) in the control region of the first beam; and the second time-frequency resource is at least one PRB in the control region of the second beam.

9. The network device of claim 6, wherein the processor is further configured to determine a third time-frequency resource from the control region of the second beam;

the transceiver is further configured to transmit third information to a third network device, and the third network device comprises information for indicating a third time-frequency resource, so that the third network device assists the second beam to transmit the control channel to a second terminal device on a fourth time-frequency resource in the control region of a third beam, the fourth time-frequency resource comprising at least part of the third time-frequency resource; and the transceiver is further configured to transmit, on the third time-frequency resource, the control channel to the second terminal device via the third beam.

10. A terminal device, comprising:

a processor configured to acquire configuration information of a first time-frequency resource, wherein the first time-frequency resource is a source in a control region of a service beam;

a transceiver configured to receive control channel according to the configuration information, wherein the control channel is transmitted from a network device on the first time-frequency resource via a first beam and on a second time-frequency resource via a second beam, and wherein the first time-frequency resource is the resource in the control region of the first beam, and the second time-frequency resource is the resource in the control region of the second beam, the second time-frequency resource comprising at least part of the first time-frequency resource, and wherein the first beam is a service beam of the terminal device, and the second beam is a non-service beam potentially interfering with the service beam of the terminal device;

wherein the first beam and the second beam are different beams of a same network device, and the control channel is transmitted from the same network device, based on configuration of same demodulation reference signal, on the first time-frequency resource via the first beam and on the second time-frequency resource via the second beam, respectively; or wherein the first beam and the second beam are beams of different network devices, and the control channel is transmitted from the different network devices, based on configuration of the same demodulation reference signal, on the first time-frequency resource via the first beam and on the second time-frequency resource via the second beam, respectively.

* * * * *